United States Patent
James et al.

(10) Patent No.: US 10,316,618 B2
(45) Date of Patent: Jun. 11, 2019

(54) SYSTEM AND METHOD OF CUSTOMIZABLE MATERIAL INJECTION FOR WELL CEMENTING

(71) Applicant: BJ Services, LLC, Tomball, TX (US)

(72) Inventors: Aaron James, Castle Rock, CO (US); T J McClure, Cheyenne, WY (US); Lucas Albrighton, Littleton, CO (US)

(73) Assignee: BJ Services, LLC, Tomball, TX (US)

( * ) Notice: Subject to any disclaimer, the term of this patent is extended or adjusted under 35 U.S.C. 154(b) by 231 days.

(21) Appl. No.: 14/967,824

(22) Filed: Dec. 14, 2015

(65) Prior Publication Data

US 2017/0167223 A1    Jun. 15, 2017

(51) Int. Cl.
| | |
|---|---|
| E21B 33/13 | (2006.01) |
| C04B 28/02 | (2006.01) |
| E21B 33/14 | (2006.01) |
| C09K 8/42 | (2006.01) |
| E21B 47/00 | (2012.01) |

(52) U.S. Cl.
CPC ............... *E21B 33/14* (2013.01); *C09K 8/42* (2013.01); *E21B 47/00* (2013.01)

(58) Field of Classification Search
CPC ...... E21B 33/10; E21B 33/13; E21B 47/0005; C09K 8/424; C04B 28/02
See application file for complete search history.

(56) References Cited

U.S. PATENT DOCUMENTS

| | | | |
|---|---|---|---|
| 4,466,759 A | 8/1984 | Sweeney et al. | |
| 4,484,861 A | 11/1984 | Sweeney et al. | |
| 5,289,877 A | 3/1994 | Naegele et al. | |
| 5,314,022 A * | 5/1994 | Cowan .................... | C04B 28/08 166/292 |
| 7,464,757 B2 | 12/2008 | Pessin et al. | |
| 7,686,499 B2 | 3/2010 | Dykstra et al. | |
| 2003/0079912 A1* | 5/2003 | Leuchtenberg ......... | E21B 21/08 175/38 |
| 2007/0151907 A1 | 7/2007 | Duhe et al. | |
| 2007/0286746 A1 | 12/2007 | Thrasher et al. | |

(Continued)

FOREIGN PATENT DOCUMENTS

WO    WO 2008/139171    11/2008

OTHER PUBLICATIONS

"Static Mixers," Samahwa Mixing Tech. Co. Ltd., 2012, retrieved from https://web.archive.org/web/20120604232347/http://www.samhwamix.com/product/static_mixers/, 6 pages.

(Continued)

*Primary Examiner* — Catherine Loikith
(74) *Attorney, Agent, or Firm* — Keith B. Willhelm

(57) ABSTRACT

The invention includes a system and method for determining and using liquid based chemical additives to modify the performance of various products used during downhole cementing of wells such as oil wells. The method comprises preparing a cement mix, determining a fluid properties profile for the mix corresponding to discrete elevations or sections within the well to be cemented, preparing chemical additives to modify the fluid properties of the mix, and pumping the cement mix while continuously injecting additives to ensure the cement mix conforms to the fluid properties profile.

33 Claims, 21 Drawing Sheets

(56) References Cited

U.S. PATENT DOCUMENTS

2007/0295509 A1  12/2007  Pessin et al.

OTHER PUBLICATIONS

"Vee-Cone Blenders," Munson Machinery Company, Inc., 2012, retrieved from https://web.archive.org/web/20120220000333/http://www.munsonmachinery.com/products/mixing/Vee_Cone_Blender/index.asp, 2 pages.
"V-Shell Powder Blenders," Pharmatech, 2006, retrieved from https://web.archive.org/web/20060824145139/http://www.pharmatech.co.uk/vshell_blenders.html, 3 pages.
Dirienzo et al., "Porous poly(para-phenylene) scaffolds for load-bearing orthopedic applications," Journal of the Mechanical Behavior of Biomedical Materials, 2014, vol. 30, pp. 347-357, abstract only, 4 pages.

* cited by examiner

SYSTEM AND METHOD OF CUSTOMIZABLE MATERIAL INJECTION FOR WELL CEMENTING

FIELD OF THE INVENTION

The invention relates to a system and method of liquid chemical injection to optimize construction and remediation of well bore casings for wells such as oil, gas, and other types of wells, and more particularly, to a system and method of injection during cementing operations.

BACKGROUND

In order to stabilize a downhole emplacement such as a bored or drilled hole forming a well, it typically requires multiple materials that are dry blended in a pneumatic bulk plant and then injected down hole in a cementing process. These dry materials can include cement, pozzolanic fly ash, silica, chemical additives that alter the cure time (accelerators/retarders), fluid loss materials, viscosifiers, defoamers, friction reducers, extenders, and other chemical additives that alter a product's performance downhole. These materials are blended in the pneumatic bulk plant and require multiple transfers to obtain a product that is sufficiently homogenous. Once the blending process is complete, the performance characteristics of the product are set since the blended mix cannot be re-mixed once it is removed from the bulk plant location.

The blended dry product is then transported to the site of the oil/gas well using bulk storage units (e.g. bulk trailers, or transports). The product is then introduced to a pumping and mixing truck, such as by pneumatic conveying. In the mixing truck, water is added to the dry product in specific measured quantities to achieve a desired density product slurry that can be measured using a densitometer. The mixing of water with the dry product is done "on the fly"—that is, continually mixed and pumped: pumping operations are not stopped during mixing operations in which the desired product slurry density may be achieved automatically through an electronic control system. The mixing truck may include controls such as water and cement throttling valves that are adjusted dynamically via the electronic control system to ensure that the measured density of the fluid is in agreement with a desired density that is typically determined by the user.

When the slurry mix has achieved the desired density, it can be pumped downhole within a well form casing that is pre-positioned in the well. A drilling or work over-rig may be used to pump the slurry mix in which an annular space between the wellbore and casing are filled incrementally as the slurry mix is pumped.

SUMMARY

According to the invention, it includes a system and method for providing liquid based chemical additives to modify a product's performance during downhole pumping operations therefore enabling cementing of a well with a casing having multiple characteristics specifically tailored to a particular well. The product delivered downhole with the selected chemical additives has a much larger available range of performance capabilities that prevents having to conduct extra or redundant mixing prior to downhole delivery, whether mixing may occur only at a bulk plant and/or at the jobsite where the well is located.

According to a system of the invention, a blended product is supplied, such as from a bulk plant, and the blended product is stored at the jobsite. A mixing and pumping unit is also co-located at the jobsite along with a dedicated chemical storage unit such as a mobile chemical truck that carries all of the necessary products and chemicals to make desired modifications to the product on location. The liquid chemical additives may include, but are not limited to, accelerators, retarders, fluid loss additives, viscosifiers, dispersants, lightweight additives, surfactants, clay control and bacteria control additives, de-foamers, gas migration additives, and foamers.

It is one object of the invention to provide a system and method for modifying fluid properties during oil well cementing operations. The method includes preparing an industrial mix that may be specifically tailored for a well having multiple and unique construction requirements. The method more specifically includes determining a fluid properties profile for the industrial mix, wherein the fluid properties profile defines a plurality of zones, wherein each of the zones requires a predetermined fluid composition that can be selectively modified on one or any combination of factors including: a) well temperature, b) casing characteristics, c) open-hole size, d) fluid rheology, and e) ground geological formation. Other steps include preparing chemical additives, wherein the chemical additives modify a fluid composition of the industrial mix, and pumping the industrial mix down a well. Chemical additives are added to the industrial mix during pumping such that the fluid composition of the industrial mix is selectively and continually modified to correspond to the desired predetermined fluid composition for each of the zones. The industrial mix may include a cement slurry, spacer, flush, or displacement fluid mix either individually or in a combination. The industrial mix may also include other necessary chemical additives, components, fluids, or mixes necessary to complete the pump job.

It is another object of the present invention to provide a method of obtaining a fluid properties profile to be implemented in an oil well cementing method. In one embodiment, before pumping, a fluid properties profile is created for the cement mix which is to be pumped down hole. The fluid properties profile will vary based on the particular well being drilled and define a plurality of zones, each zone having a different required predetermined fluid composition. For each well, certain design parameters may be considered when creating the fluid properties profile, including: casing characteristics, openhole size, Bottom Hole Static Temperature (BHST), Bottom Hole Circulating Temperature (BHCT), Formation Fracture Pressure and Depth, Formation Reservoir/Pore Pressure and Depth, drilling fluid rheologies, spacer/flush rheologies, all cement rheologies, displacement fluid rheologies, centralizers location, and casing attachments.

It is another object of the invention to provide a system for continuously and automatically modifying fluid properties during oil well cementing. In one embodiment, the system includes at least one cement slurry mix tub and recirculation line, at least one liquid chemical additive pump, tote, and recirculation line, a water source, a centrifugal mix water pump, a centrifugal boost pump, a dry blended material supply line, a recirculation densitometer, a positive displacement pump, a high pressure densitometer, and a high pressure discharge line which connects to casing at the rig.

Ramped injection of chemicals is desirable for a number of reasons, depending on the fluid property being modified. Ramped injection may be defined as any injection of the chemical additives in which injection is not constant when measuring injection over time and/or measuring injection as pumping a downhole mix fills known depth portions of a well. For example, when addressing the free fluid property, the final temperature the fluid is exposed to varies based on depth. Being able to inject additives in a ramped manner can aid in reducing the need to run multiple fluids. Similarly, when looking at the property of fluid loss, the formations that a fluid is pumped past vary as a function of depth, and each formation has a potentially different permeability and water sensitivity. Adding chemicals in a ramped injection manner reduces risk of dehydration prematurely, thereby providing a lower cost solution for customers, as well as reducing the number of slurries required to successfully isolate the wellbore and complete the job. When reviewing wellbore rheologies, providing ramped injection of liquid dispersants and viscosifiers allows for more precise control of fluid rheologies which, in turn, aids in minimizing risk of fracturing formations while at the same time maintaining enough pressure to control producing formations. When addressing required thickening times of wellbore materials, adjusting injection of liquid retarders and accelerators helps to decrease the waiting time for material such as cement to set and further aids in the reduction of post placement formation fluid influx. Adjusted injection also helps to prevent over retardation, or under accelerating, of leading edges of downhole cement. The ramped or non-uniform delivery of selected chemicals therefore enables a column of downhole cement to set and cure more uniformly from top to bottom despite the numerous factors that militate against such uniformity in most wellbore constructions.

Similarly, with respect to the static gel strength, that can be important when dealing with potential producing formations and minimizing cement fall back, injecting chemicals in a desired ramped profile may greatly assist in manipulating static gel strength. This result may be a more advantageous static gel strength, which in turn, minimizes a potential risk of formation fluid influx post placement and cement failing due to weak formations. Additionally, ramped injection is useful when addressing compressive strengths of the fluid. By injecting chemicals that affect when a cement system develops compressive strengths, it is possible to minimize the wait time required on cement to drill out. Further, ramped injection helps to ensure that successful annular isolation is achieved when cementing across producing formations. Lastly, ramped injections are useful in dealing with sedimentation. Because the amount of sedimentation is a function of slurry density, slurry composition, and temperature, adjusting viscosifiers within a ramped injection protocol allows for more simplistic and competent fluid designs. Ramped injection further allows for the density to be adjusted by the addition of water while mixing, thereby saving money in materials and logistics for both the customer and service provider.

Further descriptions of advantages, benefits, and additional aspects of the invention will become evident from the accompanying drawings and description herein. All aspects of the invention, whether mentioned explicitly in this Summary section or not, are considered subject matter for patent protection either singly or in combination with other aspects of this disclosure. Accordingly, such aspects disclosed herein below and/or in the drawings that may be omitted from, or less than fully described in, this Summary section are fully incorporated herein by reference into this Summary. In particular, all (any) claims of the Claims section below are fully incorporated herein by reference into this Summary section.

BRIEF DESCRIPTION OF THE DRAWINGS

FIG. 16 shows an example user interface screen associated with automation of the invention achieved through a computer processor and associated computer coded instructions, in which the sample user interface provides a representative layout of a job design for setting parameters associated with a well to be cemented;

FIG. 17 shows an example of another user interface screen associated with automation of the invention in which the user interface provides a representative layout of a liquid additive pump used to achieve a desired profile for a targeted well;

FIG. 19 shows an example of another user interface screen associated with the characteristics of the pumping job;

DETAILED DESCRIPTION

Figure 1A:
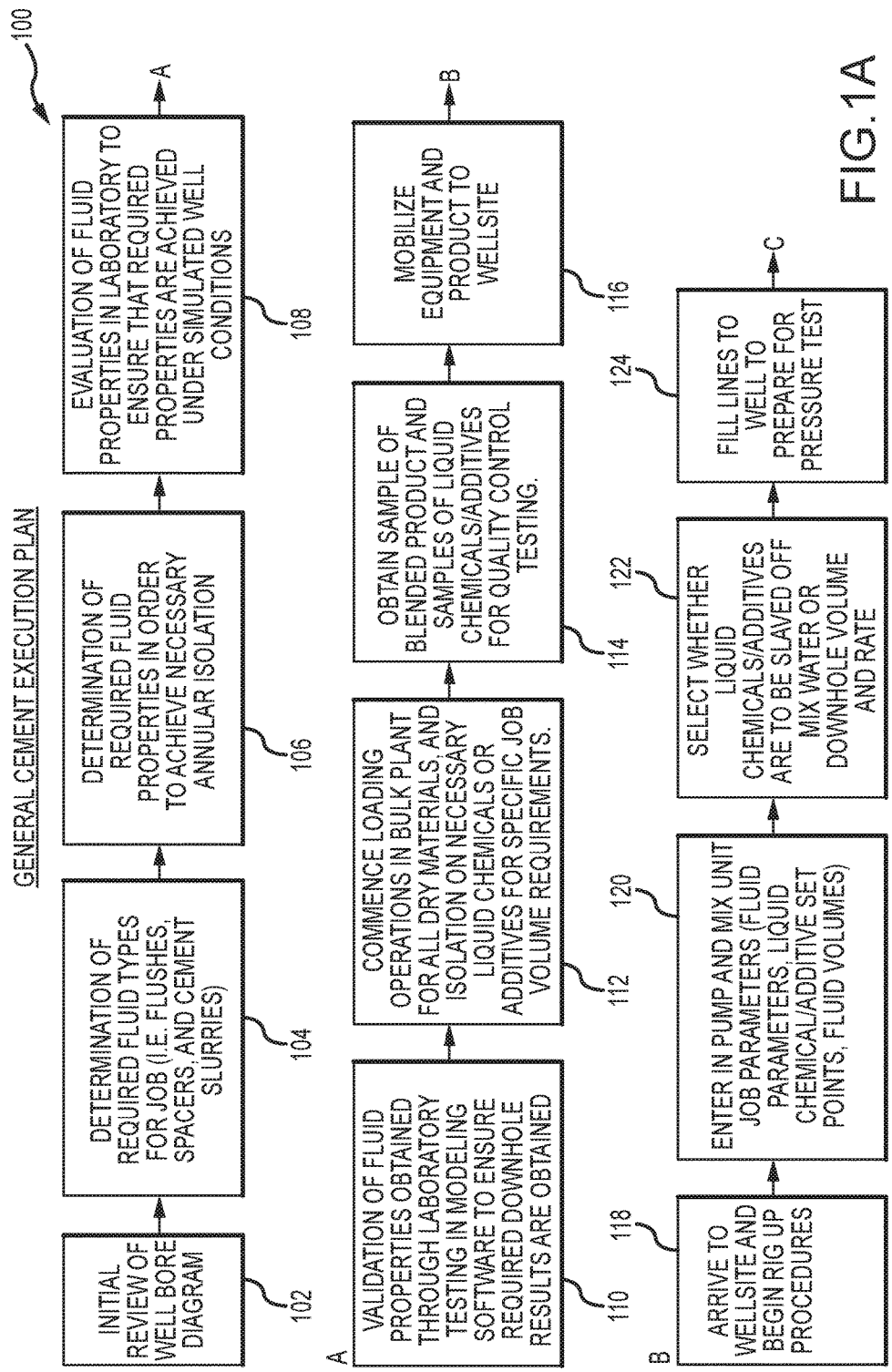
FIG. 1 is a flow chart detailing steps or parts of one embodiment of a method for modifying cement performance during pumping down a borehole in a cementing operation.
Figure 1B:
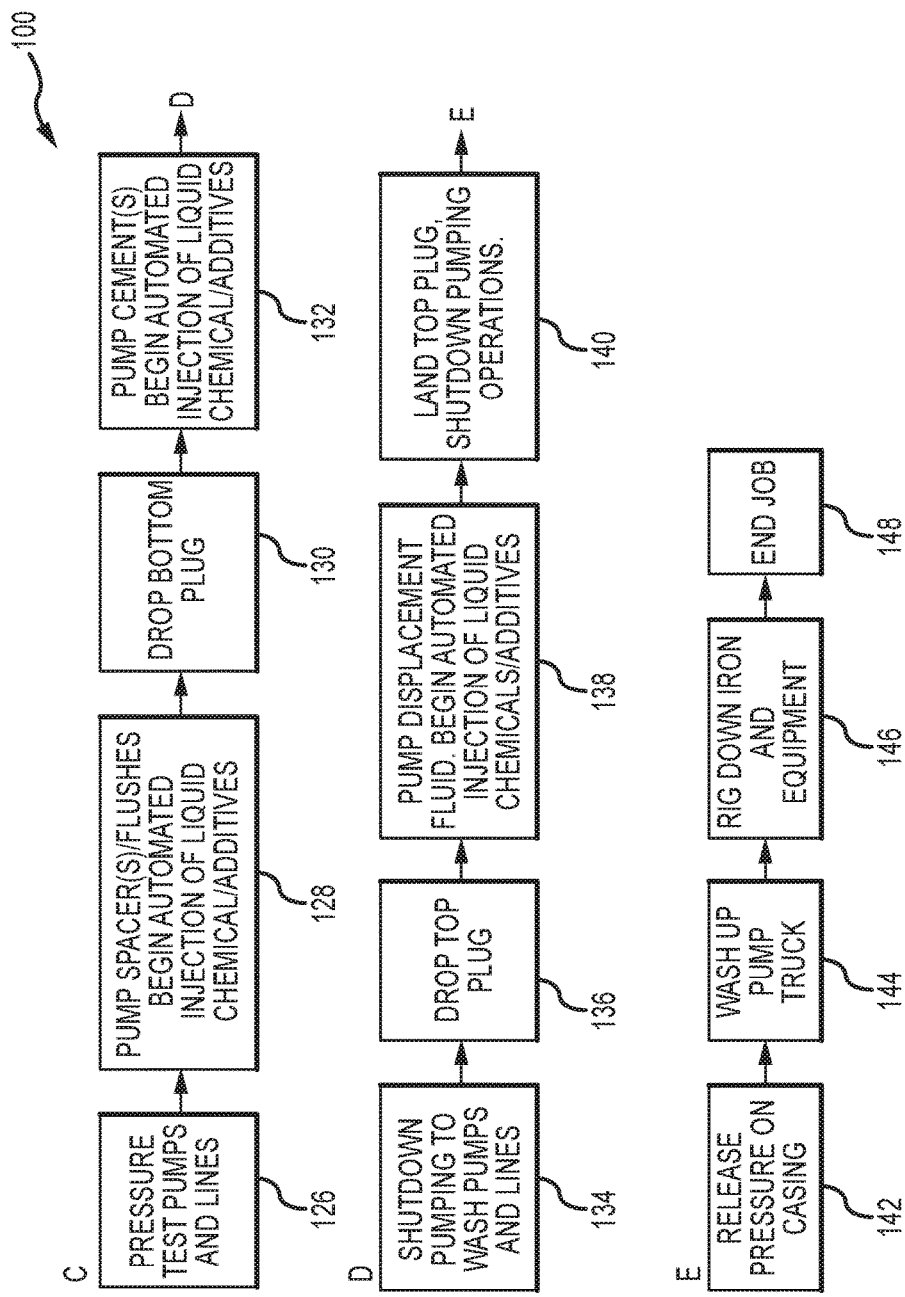

FIG. 1 details steps or parts according to a method 100 of the invention. As shown, a first step 102 is to perform an initial review of a well bore diagram. By reviewing the well bore diagram, a determination of the required fluids needed to complete the job can be made 104. Some fluids which may be required for a job include cement slurries, flushes, spacers, drilling fluid, etc. However, the exact fluids required will depend on a number of factors relative to the particular job and well bore.

Once the required fluids are known, a next step is creating a fluid properties profile 106 which will determine the properties necessary for each fluid to achieve annular isolation at a given depth. A fluid properties profile is created 106 based on a number of relevant design parameters for each particular job. The fluid properties profile 106 allows for the continuous, automatic adjustment of the fluids during mixing and/or pumping of the well to allow for more uniform fluid properties throughout the well. The design parameters may include, but are not limited to:

Casing depths, outer and inner diameters, casing weights, and grades;

Openhole size—Ideally, a caliper log is available that will allow for a foot by foot measure of the actual hole size. When a caliper log is not available, drill bit size or an average hole size is used as the openhole size;

Bottom Hole Static Temperature (BHST)—The BHST is ideally obtained from temperature logs ran on the actual well in question, but is often based on field accepted values (described by the temperature gradient (° F./100 ft) plus the surface temperature);

Bottom Hole Circulating Temperature (BHCT)—The BHCT is obtained either from an American Petroleum Institute algorithm and tabular correlations, direct measurements via downhole tools, or through computer simulations;

Formation Facture Pressure and Depth;

Formation Reservoir/Pore Pressure and Depth;

Drilling fluid Rheologies—Rheologies are typically obtained from direct measurement using a viscometer and are obtained at multiple temperatures. Usually, the rheologies are measured at surface temperature, BHCT, and at a temperature in between surface temperature and BHCT. When it is not possible to directly measure the drilling fluid rheologies, a drilling fluid report is obtained and the Plastic Viscosity and Yield Point listed on this fluid report are utilized;

Spacer/Flush Rheologies—Rheologies are obtained from direct measurement using a viscometer and are obtained at multiple temperatures. Usually, the rheologies are measured at surface temperature, BHCT, and at a temperature in between surface temperature and BHCT;

All Cement Rheologies—Rheologies are obtained from direct measurement using a viscometer and are obtained at multiple temperatures. Usually, the rheologies are measured at surface temperature, BHCT, and at a temperature in between surface temperature and BHCT;

Displacement Fluid Rheologies—Rheologies are typically obtained from direct measurement using a viscometer and are obtained at multiple temperatures. Usually the rheologies are measured at surface temperature, BHCT, and a temperature in between surface temperature and BHCT. When it is not possible to directly measure the displacement fluids rheologies, a drilling fluid report is obtained and the Plastic Viscosity and Yield Point listed on this report are used. If displacement fluid is Newtonian in nature, acceptable values are used for the fluid viscosity;

Centralizers Location—Centralizers aid in casing centralization which allow for effective drilling fluid removal and proper cement placement. Simulation work is done to ensure that the proper centralizer is chosen to ensure that the casing stays effectively centered in the wellbore; and Casing Attachments—The location of the guide, or float shoe, and the float collar is important as the location aids in the determination of the length of the shoe track/shoe joint. Guide or float shoes are attached to the bottom of the casing. The float collar is installed at a pre-determined location above the guide or float shoe. The term "float" indicates that the piece of equipment contains a one-way valve that prevents fluid re-entry into the casing above the piece of equipment. The shoe track/joint is purposely left full of cement at the completion of the job. This is due to the fact that the top plug used to isolate the cement from the displacement fluid, lands on top of the float collar preventing additional fluid from being pumped below the float collar.

Once a fluid properties profile is created 106 using at least one of the above design parameters, the next step is selecting chemical additives that will be required to modify the fluid properties during the job. The chemical additives may include, but are not limited to:

Accelerators—Materials that fall into this category are used to shorten the thickening time, or working time of cement slurry. These additives are commonly inorganic in nature, and are primarily used in low temperature applications such as surface casings, conductor casings, and shallow productions and remedial work;

Retarders—Any material that prolongs the thickening time of the cement slurry is commonly referred as a retarder. Many retarders are either organic based or have a pH that is more acidic. Retarders are typically used when dealing with high temperature wellbore environments, or where there is a need to have a longer thickening time due to the amount of volume that is required to be pumped, or where the expected job pump rate is low;

Fluid Loss Additives—Chemicals used to control the amount of filtrate that is allowed to leave the cement slurry when exposed to a differential in pressure. This differential in pressure is seen down hole when the formation in question is permeable and the equivalent circulating density (ECD) or equivalent mud weight (EMW) is higher than the formation pressure. The equivalent mud weight is calculated by calculating the hydrostatic pressure of each fluid in the wellbore above a specific location in the wellbore. All of these individual pressures are added together, divided by the total vertical distance from the top fluid to the point of interest in the well bore, and then divided by 0.05195 (psi/ft)/(lb/gal). The ECD is essentially the EMW plus the friction pressure incurred from the point of interest to the surface. This unit is typically expressed as a gradient with units of lb/gal. Fluid loss additives area also sometimes used to control filtrate loss when cementing past water sensitive formations, such as shale and salt formations;

Viscosifiers—Materials used to increase the viscosity of the cement slurry or spacer. Situations exist where it is necessary to increase the viscosity to maintain rheological hierarchy with neighboring fluids in the annulus to promote effective fluid displacement or to combat the effects of thermal thinning. Viscosifiers are typically polymer or clay based materials, however, there are some other inorganic materials that will promote a more viscous fluid;

Dispersants—Chemicals used to lower a fluids viscosity and/or aid in surface mixing operations;

Lightweight Additives—It is often necessary to reduce the hydrostatic pressure due to the presence of weak formations or to aid in lowering the cost of cement slurry. When this situation exists, materials that either have a low density or absorb a large amount of water due to hydration or a chemical reaction are typically used. This allows for the development of competent cement slurry when designing a slurry below the base cement's neat density range;

Surfactants—Liquid materials that are typically used in flush or spacers pumped ahead of the cement slurry to aid in drilling fluid removal. They can also be used in flushes and spacers to help generate a water wet environment whenever an oil/diesel based drilling fluid is used to drill a specific section of a wellbore. Surfactants are also sometimes added to the displacement fluid pumped behind the cement for specific completion purposes;

Clay Control and Bacteria Control Additives—During the displacement stage of a cementing job, it is often requested that chemicals be added to the displacement fluid to help control swelling of clay formations or bacteria growth in the displacement fluid for well completion purposes;

Defoamers—Often times, the addition of chemical additives to the cement slurry can cause excess foaming during mixing operations. This foaming can be problematic for effectively conveying the cement slurry to the well due to pump cavitation. Accordingly, if foaming begins to occur, defoaming agents are added to the slurry to prevent excess foaming;

Gas Migration Additives—When cementing across formations that have a high reservoir pressure or when there is a small difference between the EMW at the end of the job, and the reservoir pressure gradients (often referred to as the formation pore pressure gradient), the risk for having formation fluid influx into the cement column post placement may be high. Accordingly, specific additives are added to help reduce and eliminate the risks associated with gas migration; and Foamers—When dealing with lost circulation zones or high pressured formations, it is advantageous to pump cement that has been foamed with nitrogen. In order to keep the nitrogen bubbles entrained and properly distributed in the cement slurry, a foamer is added. Foamers are almost always liquid based materials.

Once the chemical additives necessary to create the desired fluid profile are obtained, the fluid properties profile is optionally evaluated under simulated well conditions in a cement laboratory 108 and then validated via modeling software 110 to ensure the required fluid properties are achieved under well conditions and to ensure the required downhole results are actually obtained. Once finished, the necessary materials (i.e., dry materials, spacers, flushes, drilling fluid, liquid chemical additives, etc.) are loaded 112 based on the specific volumes required for the job. According to the invention, before mobilization of the operation to the job site 116, samples of the blended cement product and chemical additives may be taken for quality control testing 114.

Once at the job site, rig up procedures are started 118 and the fluids properties profile is entered into a pumping system as mix unit job parameters 120. These parameters include fluid parameters, liquid chemical additive set points, and fluid volumes. This step will be addressed in more detail with reference to FIGS. 11-12, below.

After the parameters have been entered, pumping operations begin. The system for pumping 200 will be discussed in greater detail with reference to FIG. 2, below. A user first selects whether the liquid chemical additives are to be slaved off mix water volume and rate or downhole volume and rate 122, depending on the chemical additive. For example, additives which enhance the properties of the fluid specific to the well's requirements or which allow for easier mobilization of resources for cementing the well are slaved off mix volume. On the other hand, additives which generate foam when sheared are slaved off downhole volume and rate. Next, a pressure test may be conducted 126. This is done by filling the lines to the well 124 to test the pressure in the pumps and lines. Once the pressure test 126 is successfully completed, pumping can begin.

Pumping begins by pumping spacers and/or flushes down the well 128. Based on the previously created fluid properties profile 106 and with the parameters previously entered into the pumping system 120, liquid chemical additives will automatically be injected into the mix 128 to ensure the properties of the spacers and/or flushes conform to the fluid properties profile. Next, a user drops a bottom plug 130. Following the bottom plug 130, the user begins to pump the cement slurry 132. Based on the previously created fluid properties profile 106 and with the parameters previously entered into the pumping system 120, liquid chemical additives will automatically be injected into the cement slurry 132 to ensure the properties of the slurry conform to the fluid properties profile. Following the pumping of the cement slurry 132, the pumping is shut down 134 so that the pumps and lines may be washed 134.

At this stage, a user next drops a top plug 136 down the well before beginning to pump displacement fluid down the well 138. Based on the previously created fluid properties profile 106 and with the parameters previously entered into the pumping system 120, liquid chemical additives will automatically be injected into the displacement fluid 138 to ensure the properties of the displacement fluid conform to the fluid properties profile. Once pumping is completed, the top plug is landed 140 and pumping operations are shutdown 140. Following shutdown, a user may optionally release the pressure on the casings 142, wash the pump truck 144, rig down iron and other equipment 146, and end the job 148.

Figure 2:
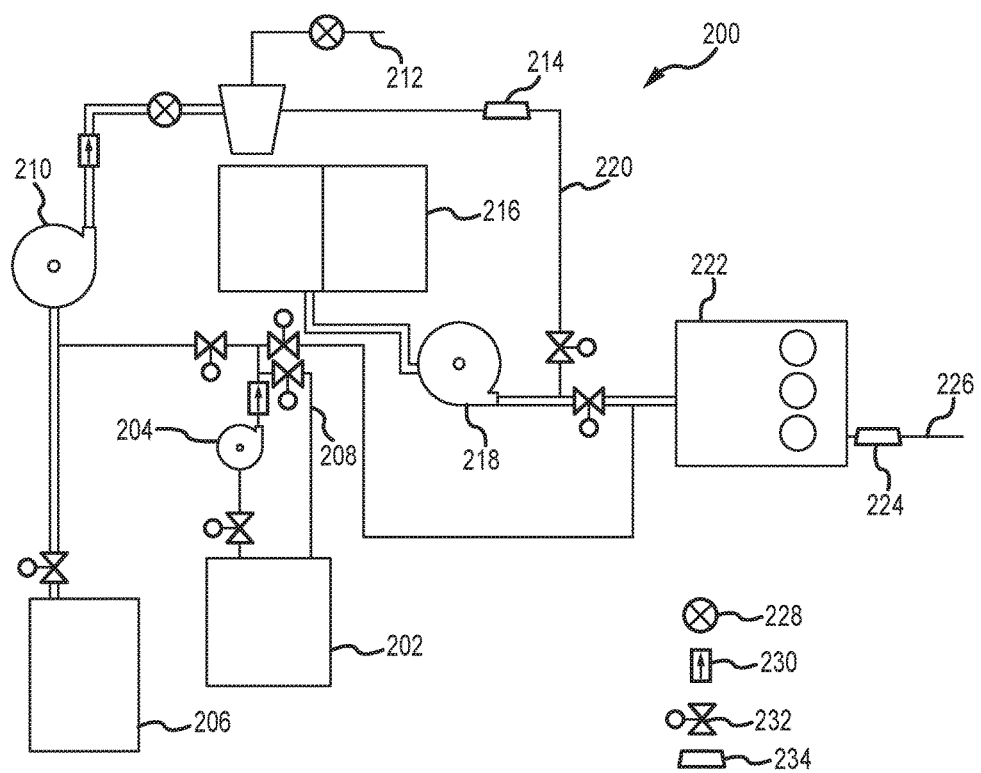
FIG. 2 shows one embodiment of a system of the invention and the system which may also carry out the method of FIG. 1.

FIG. 2 shows one embodiment of a system 200 which may be utilized to add liquid chemical additives to a cement slurry and then to pump the cement slurry. As shown, the system includes at least one cement slurry mix tub 216 and recirculation line 220, at least one liquid chemical additive pump 204, tote 202, and recirculation line 208, a water source 206, a centrifugal mix water pump 210, a centrifugal boost pump 218, a dry blended material supply line 212, a recirculation densitometer 214, a positive displacement pump 222, a high pressure densitometer 224, and a high pressure discharge line 226 which connects to casing at the rig. Additionally, the system 200 may include a plurality of throttling valves 228, flowmeters 230, control valves 232, and additional densitometers 234.

In a preferred embodiment, liquid chemical additives are added directly to the water source 206 before mixing with the dry blended material from the dry blended material supply line 212 which will become the cement or spacer slurry. This ensures that the liquid chemical additives receive the proper amount of shear while in the centrifugal mix water pump 210 prior to going through the water flow meter 230 and mixing with the dry product. Alternatively, the liquid chemical additives may be added downstream of the mixing operations, but prior to being introduced into the positive displacement pumps 222 on the mixing and pumping unit. In one embodiment, the liquid chemicals may be added in the suction header of the positive displacement pump 222. This is typically done with chemicals that will entrain air or foam when mixed in the mixing tub 216 (e.g., surfactants or foamers). Liquid injection may also be done at the suction header or downstream of the mixing operations for chemicals that produce some potential risk if exposed to personnel or the environment (e.g., ABX-30 which liberates hydrogen gas over time, or caustic or corrosive chemicals, such as biocides or caustics and acids).

Figure 3:
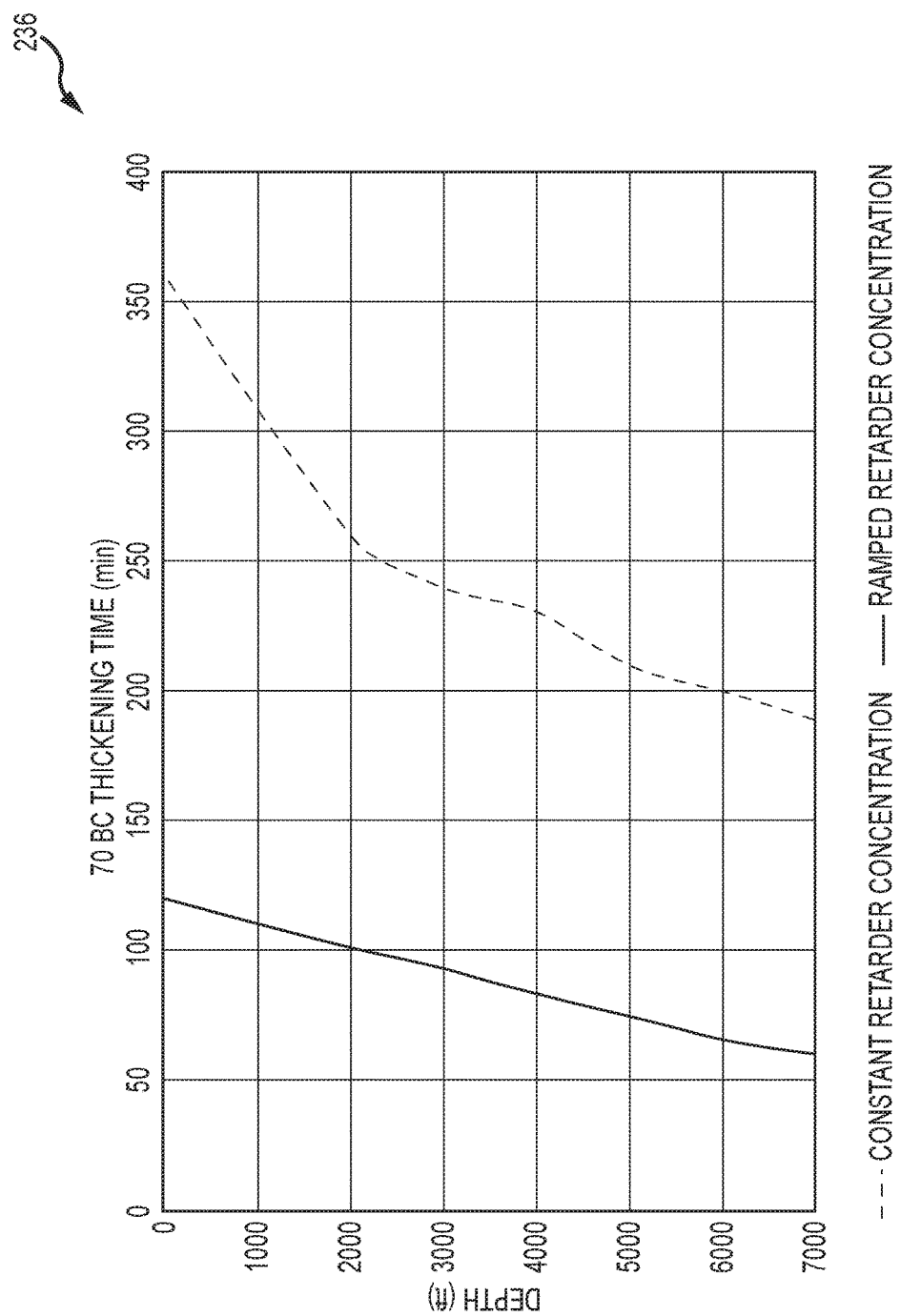
FIGS. 3-4 show graphical data regarding constant chemical versus ramped chemical additive injection profiles using retarders, the data being shown as a function of well depth and thickening time.
Figure 4:
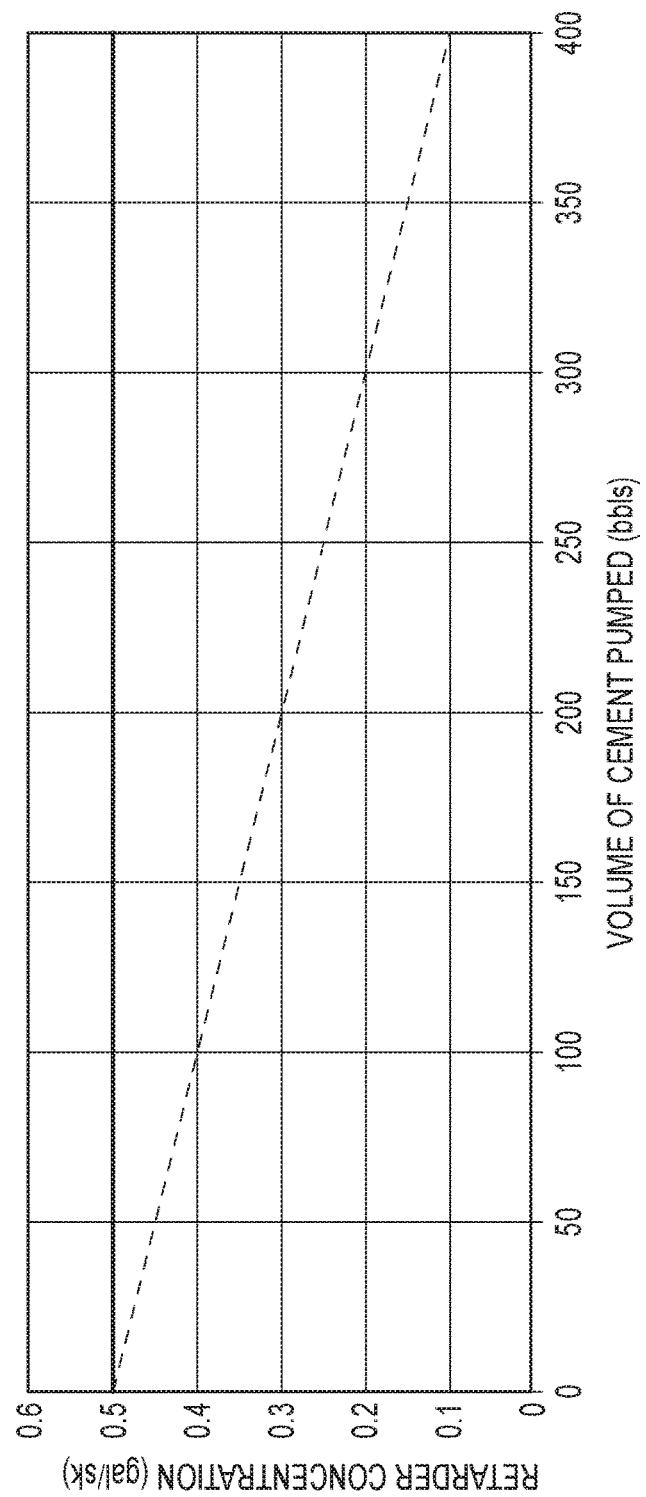

FIGS. 3-10 provide graphical information including how creating a fluid properties profile improves performance versus traditional casing construction methods in which there is but a single or homogenous product used for the entire casing. As discussed above, the fluid properties profile allows for the continuous adjustment of the fluid properties during the mixing and pumping operations. FIGS. 3-4 show the difference between a constant liquid chemical additive injection profile (traditional method) versus a ramped chemical additive injection profile (method of the present invention). As shown in FIG. 3, using retarder concentration as an example 236, the ramped concentration profile allows for a more uniform and consistent thickening time for the job as whole. On the other hand, the constant retarder concentration profile results in a thickening time which varies widely depending on the depth. Similarly, FIG. 4 shows how the retardant concentration changes as a function of cement volume 238 pumped for both ramped and constant concentrations. As shown, the ramped concentration has a steady decline in retarder concentration as the volume increases, whereas the constant concentration maintains the high level of concentration regardless of the volume of cement pumped. While FIGS. 3-4 make reference to retarders and thickening time, it is specifically contemplated in the present invention that the same or similar analysis can be conducted when assessing any relevant chemical additive concentrations and any fluid properties (i.e., stability, set time, filtrate control, viscosity, static gel strength, and gas migration).

Figure 5:
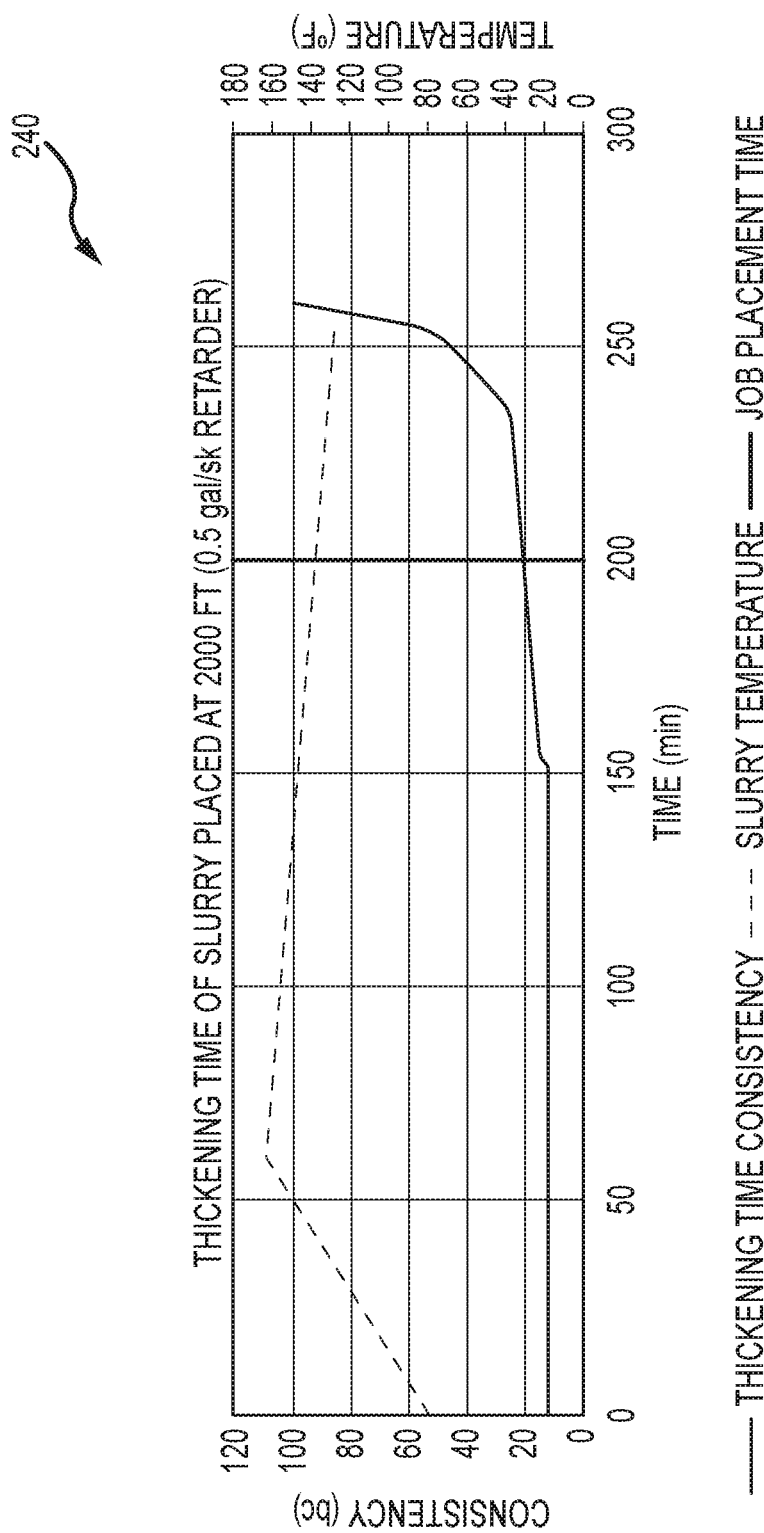
FIGS. 5-7 show graphical data regarding sample thickening time when utilizing a constant liquid chemical additive injection, the data being shown as a function of consistency and time.
Figure 6:
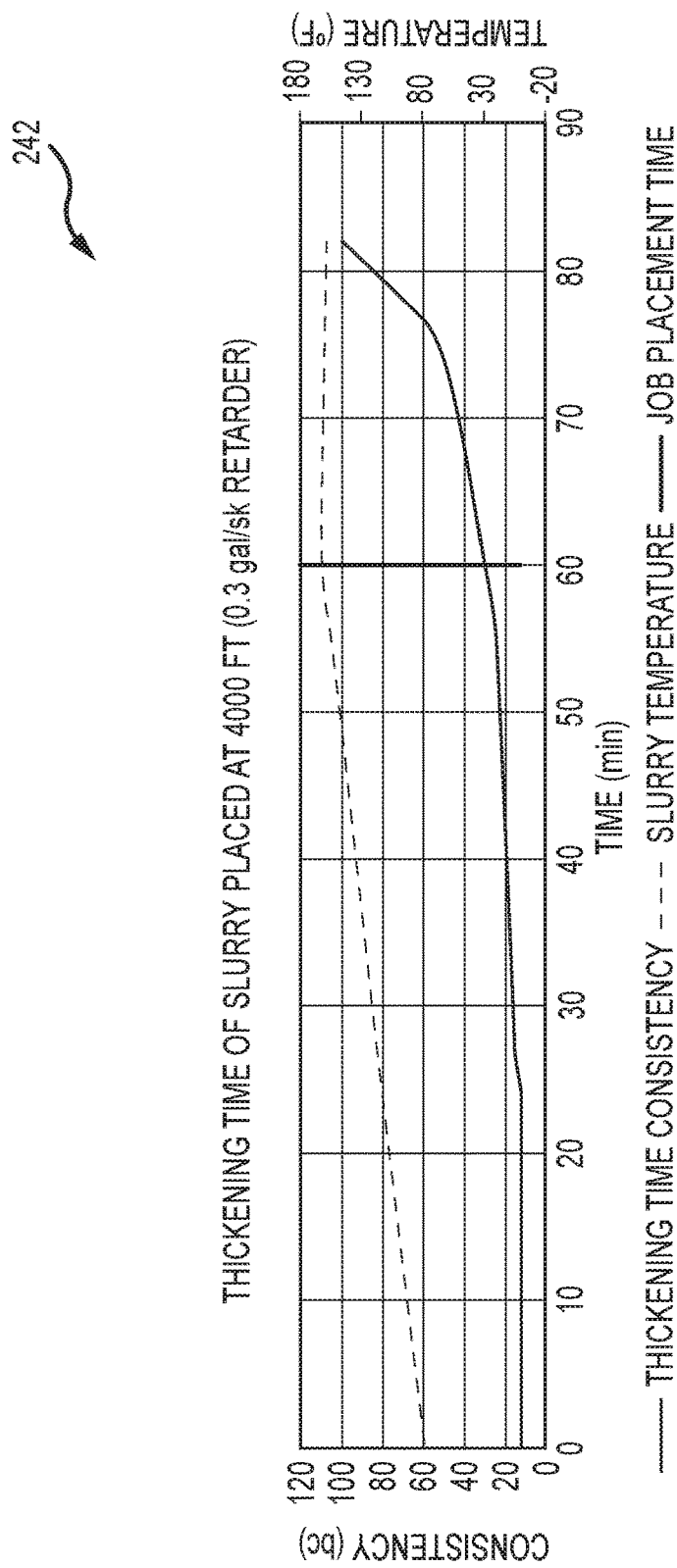
Figure 7:
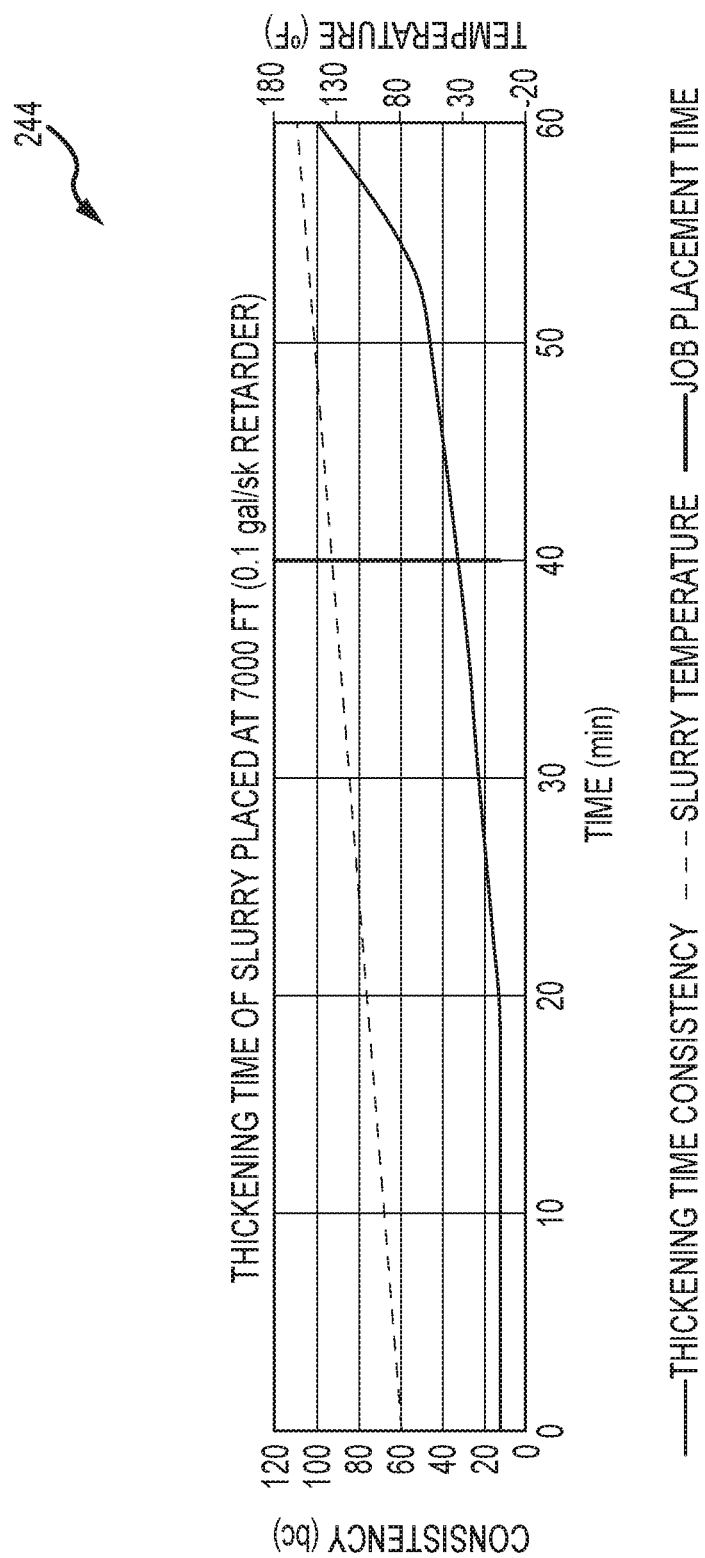
Figure 8:
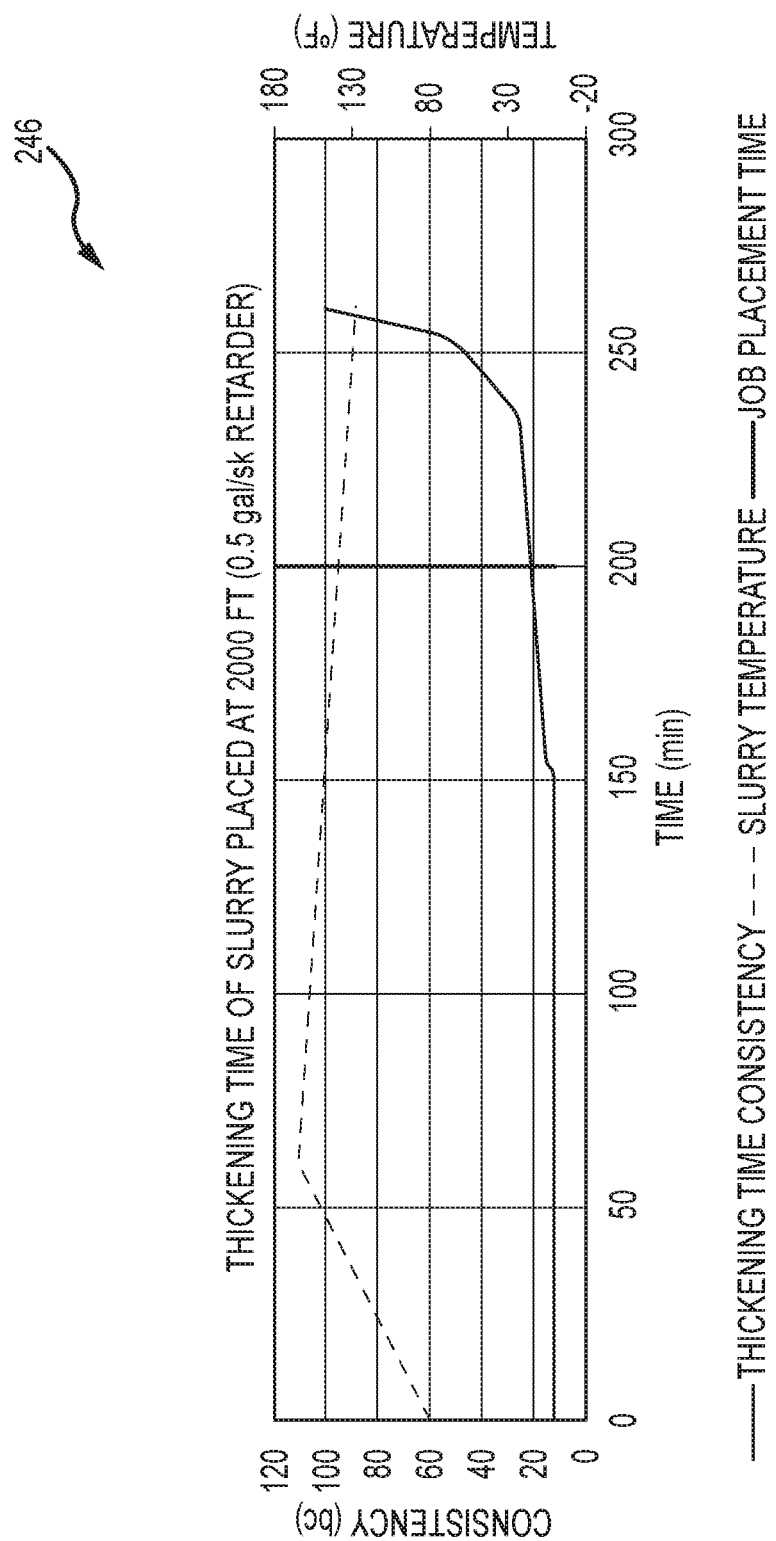
FIGS. 8-10 show graphical data regarding sample thickening time when utilizing a dynamic liquid chemical additive injection, the data being shown as a function of consistency and time.
Figure 9:
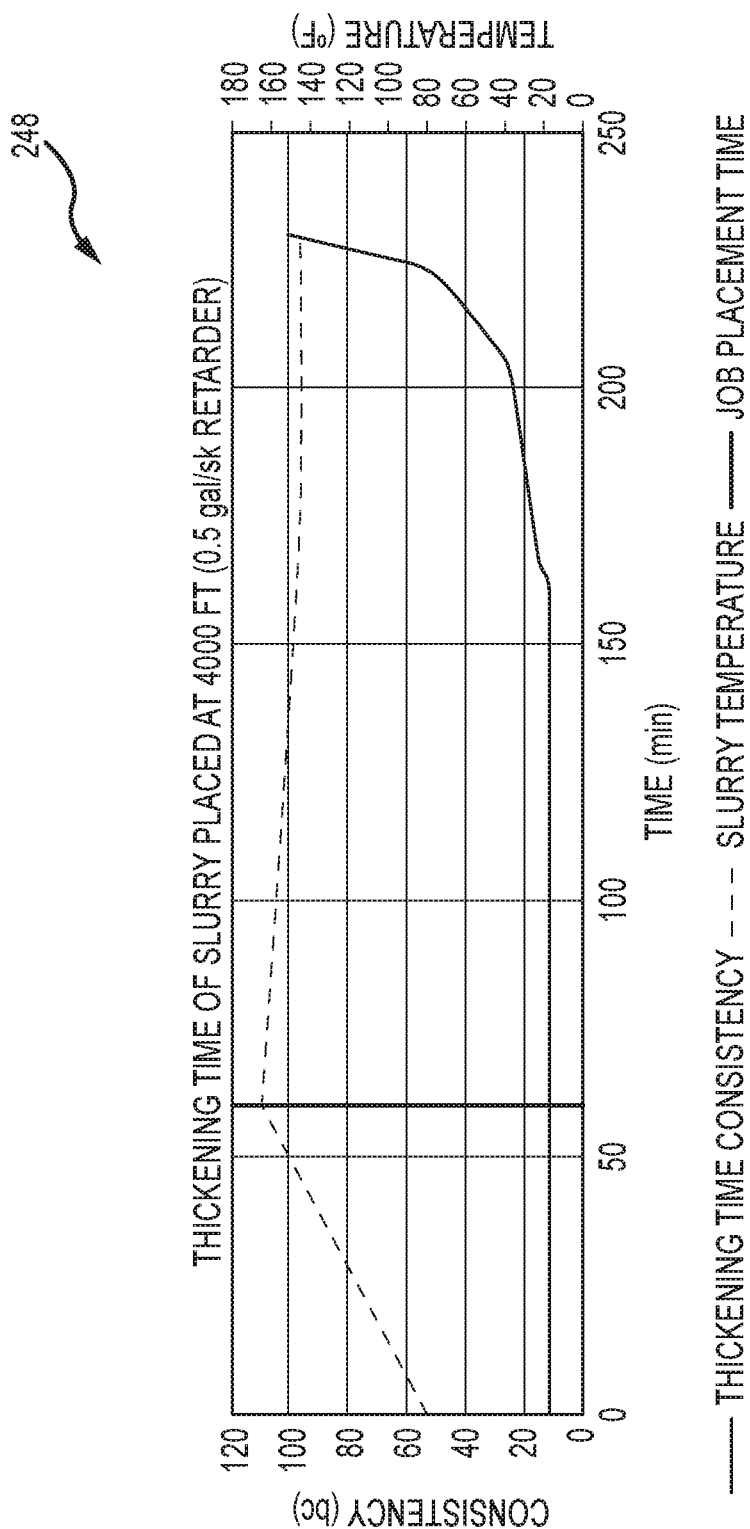
Figure 10:
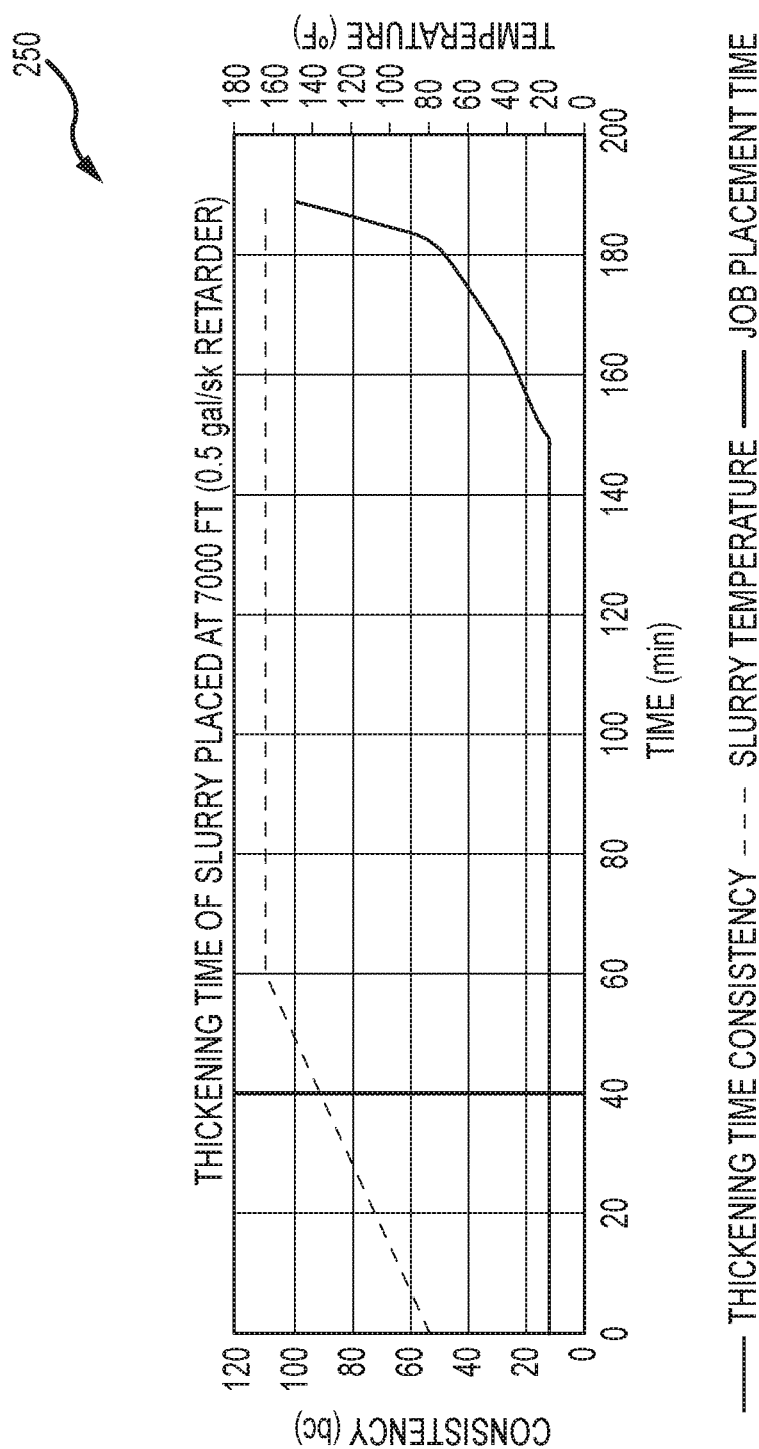

Similarly, FIGS. 5-7, showing a ramped concentration profile, can be contrasted against FIGS. 8-10, showing a constant concentration profile, to show the improved uniformity provided by the ramped concentration profiles. FIGS. 8-10 show a sample thickening time when a constant liquid chemical additive profile is used at 2000 ft (0.5 gal/sk Retarder) 246, 4000 ft (0.5 gal/sk Retarder) 248, and 7000 ft (0.5 gal/sk Retarder) 250. As shown in FIGS. 5-7, the ramped injection of liquid chemicals at 2000 ft (0.5 gal/sk Retarder) 240, 4000 ft (0.3 gal/sk Retarder) 242, and 7000 ft (0.1 gal/sk Retarder) 244, allows for more precise injection of a chemical to achieve the desired fluid performance as required by wellbore conditions, formation properties, or post placement isolation of producing formations. All of this helps to potentially reduce costs to the customer while at the same time, increase the performance of the products and allows for better long term isolation of the wellbore.

FIGS. 11-15 show example ramped profiles of various liquid additives contrasted against a downhole well. The downhole well shows many features present during the pumping process. The profile shows the downhole well in reference to the ground level 252. The downhole well includes a plurality of components including the drilling fluid 264, the spacer and/or flush 260, and a cement slurry or slurries 258. Additionally, the well casing 254 is shown which is separated from the ground by the annular space 256. Lastly, the downhole well also shows the open hole 262 present.

Figure 11:
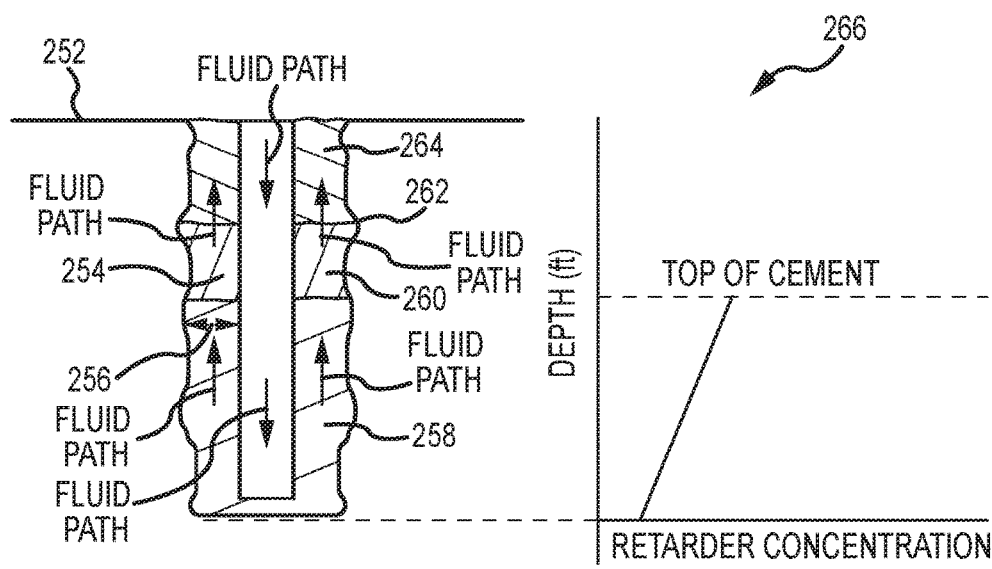
FIGS. 11-15 show example ramped profiles for various liquid additives with respect to downhole depth.
Figure 12:
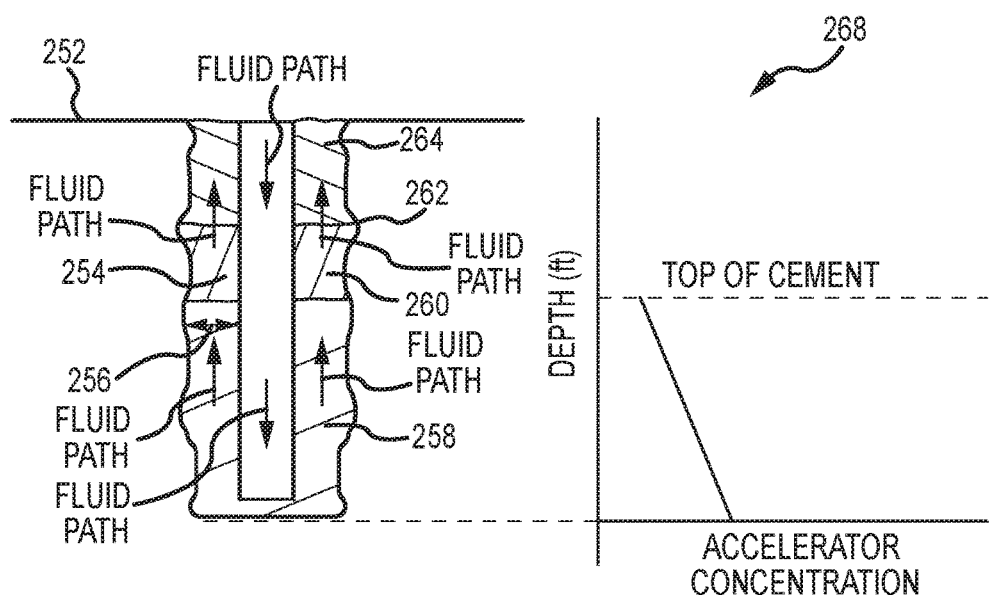
Figure 13:
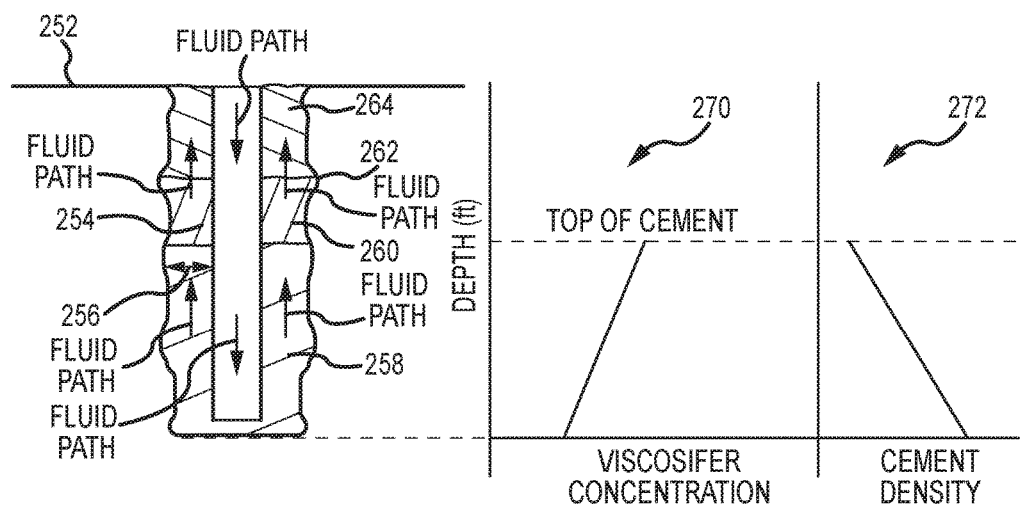
Figure 14:
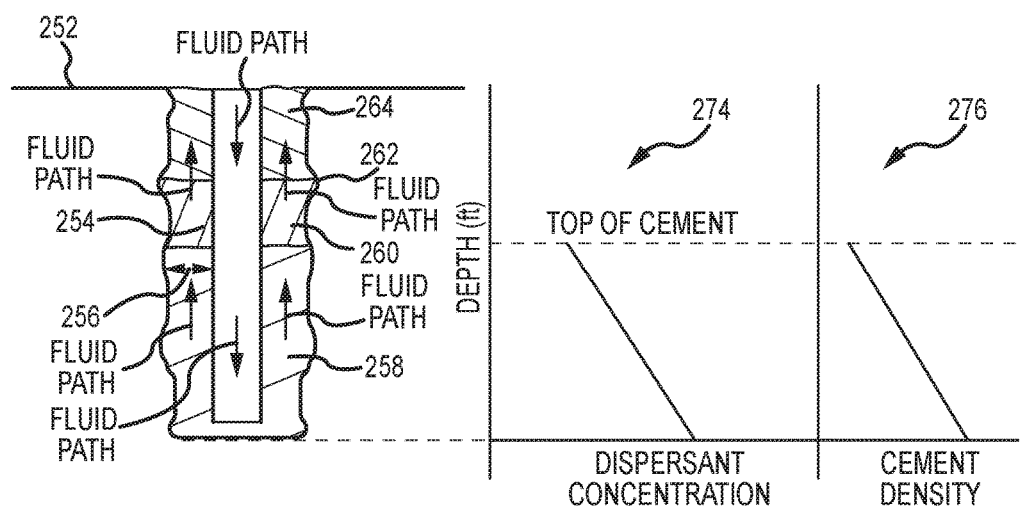
Figure 15:
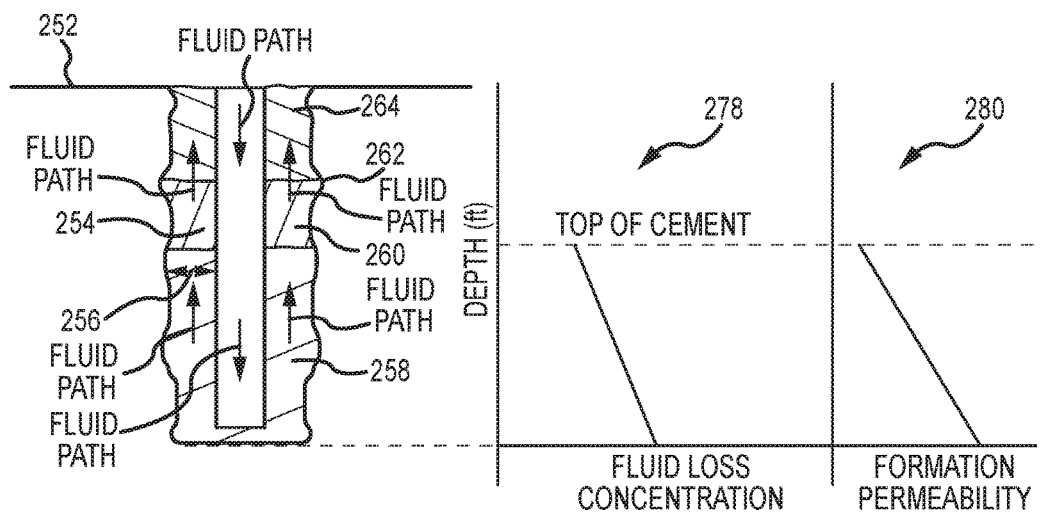

FIG. 11 shows the change in retarder concentration as a function of depth from the top of the cement 266. As shown, the retarder concentration decreases as you go deeper. Similarly, FIG. 12 shows the change in accelerator concentration as a function of depth from the top of the cement 268. As shown, the accelerator concentration increases as you go deeper. FIG. 13 shows the change in viscosifier concentration as a function of depth from the top of the cement 270 and also shows the corresponding change in cement density as a function of depth 272. As shown, the viscosifier concentration decreases as you go deeper, leading to a cement density which increases as you go deeper. FIG. 14 shows the dispersant concentration as a function of depth from the top of the cement 274 and also shows the corresponding change in cement density as a function of depth 276. As shown, the dispersant concentration increases as you go deeper, leading to a cement density which also increases with depth. Lastly, FIG. 15 shows fluid loss concentration as a function of depth from the top of the cement 278 and the corresponding formation permeability as a function of depth 280. As shown, both the fluid loss concentration and formation permeability increase as you go deeper. While FIGS. 11-15 utilize either an increasing or decreasing linear ramped injection, non-linear ramped injections may also be utilized where the particular job and formation require it.

Figure 16:
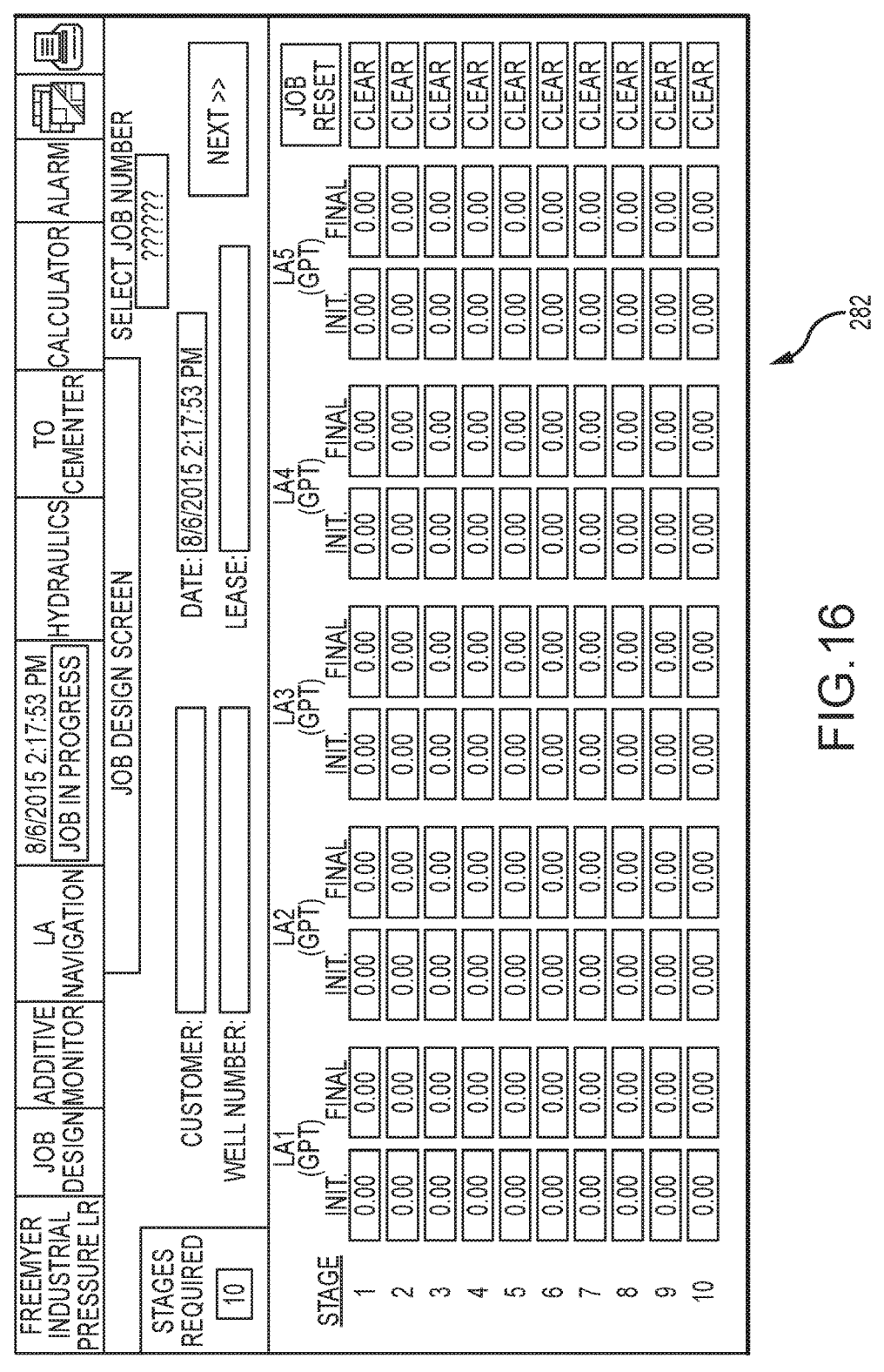

FIGS. 16-19 show example screenshots according to automation associated with the system and method of the invention, and more particularly, automation used for controlling the injection of liquid chemical additives during pumping. FIG. 16 shows an example job design screen 282 in which pump and mix unit entries can be made according to particular job parameters, as discussed with reference to FIG. 1 above. As shown, the particular job can be broken down into a plurality of stages or zones based on a fluid properties profile previously created. The user may determine for each particular job the number of stages necessary. Further, FIG. 16 allows a user to provide information for a plurality of liquid additives, identified as LA1, LA2, etc. While five liquid additive columns are shown, a second screen may be available if more additives are desired.

For each liquid additive, a user may input an initial and final concentration of that additive during each stage of the pump operation. Accordingly, a user can, for each liquid additive, determine whether a constant or ramped injection should be utilized at each stage. For example, to maintain a constant injection, a user would input the same values for both the initial and final concentrations. Alternatively, for a ramped injection, a user would input different values for the initial and final concentrations. The ramped injection may be either progressive (from 0.1 to 0.5 for example) or regressive (from 0.5 to 0.1 for example).

Figure 17:
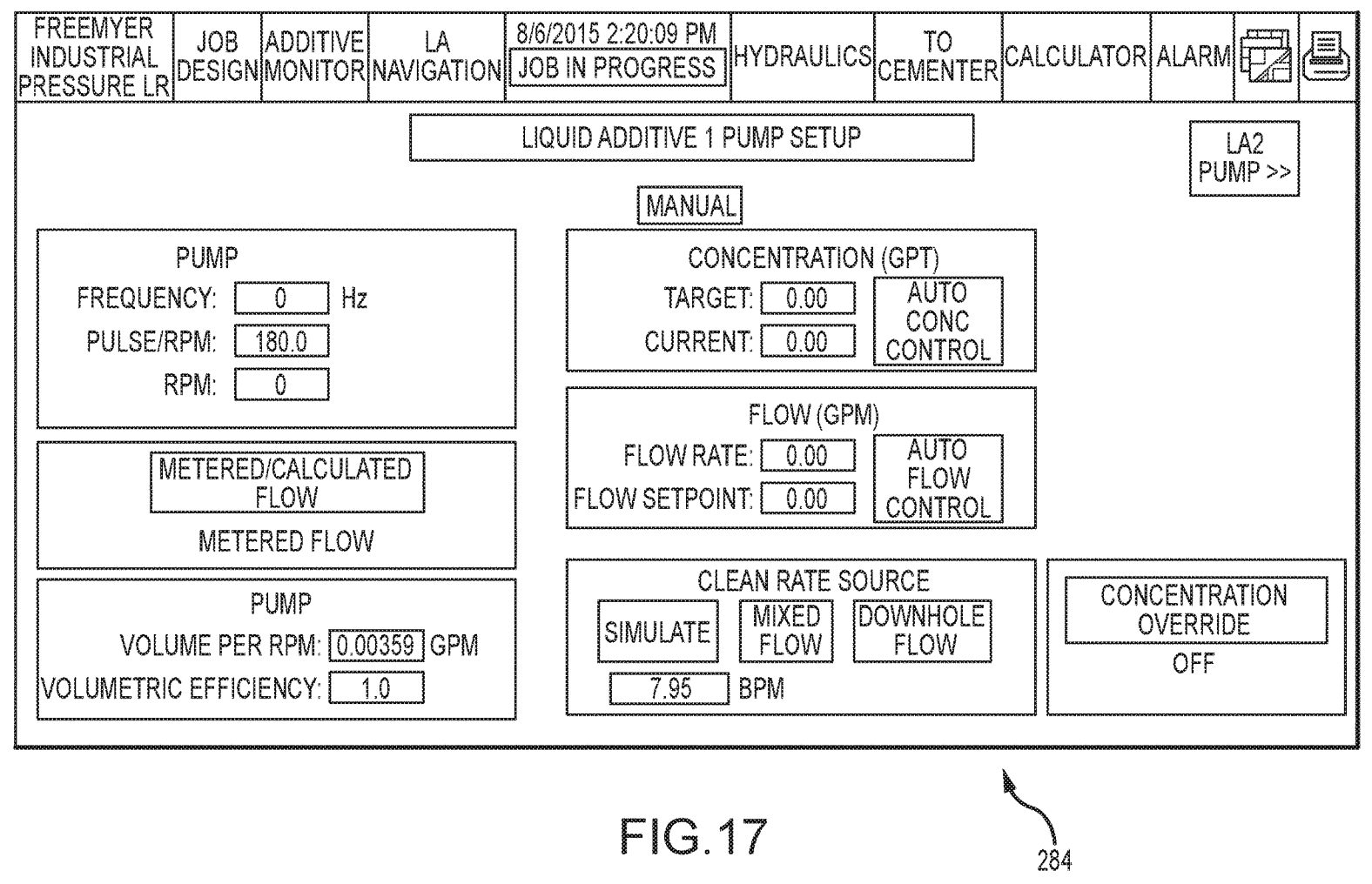

FIG. 17 shows an example pump setup screen 284. For each liquid additive, there will be a corresponding liquid additive pump and corresponding liquid additive pump screen 284. This interface 284 allows a user to input the necessary information to ensure the liquid additives are injected correctly to ensure conformity with the fluid properties profile. On this screen 284, a user may input both the current and target concentrations of the liquid additive, the flow rate, and may determine whether the flow is metered or calculated. While metered flow is the default setting, if the flow meter is not functioning, the pump can be switched to calculated mode as a backup. In this mode, the system will take the RPMs of the pump and multiply it by the volume per RPM to calculate the flow.

Additionally, it is on this screen 284 where a user may choose downhole flow, mixed flow, or simulate as the clean rate source. This allows a user to select how the additives will be slaved and will allow the user to determine how much additive will be added per unit time. The liquid chemical concentration is calculated differently based on whether it is slaved off of mix water or off of slurry. To calculate liquid chemical concentration when slaving off of mix water, the following equation is used:

Liquid Injection Concentration (gal of chemical/1000 gal of water)=Liquid Additive Concentration (gal/sk)÷Slurry Water Requirement (gal/sk)× 1000

To calculate liquid chemical concentration when slaving off of slurry, the following equation is used:

Liquid Injection Concentration (gal of chemical/1000 gal of slurry)=Liquid Additive Concentration (gal/sk)÷Slurry Yield (ft$^3$/sk)÷0.1781 (bbl/ft$^3$) ÷42 (gal/bbl)×1000

During the job, the actual liquid concentration is monitored real time during pumping operations and the liquid chemical pump rate is adjusted automatically so that the desired liquid concentration is always maintained.

The type of slaving will be selected based on the particular liquid additive. Some additives do not want to be injected into the mixed flow, but rather want to be added downhole. If downhole flow is selected, set points are achieved and will vary depending on the actual combined flow of both downhole pumps. If mixed flow is selected, set points are achieved and will vary depending on the actual flow mix water flow meter. Finally, if simulate is selected, bucket testing is performed. Additionally, simulate may also be used for troubleshooting by allowing the operator to enter a simulated rate without actually flowing through the flow meter or downhole pumps.

Figure 18:
FIG. 18 shows an example of another user interface screen associated with calibration prior to pumping.

FIG. 18 shows an example Calibration Screen 286. Following the job design setup, but before beginning the job, the Driver Side Discharge Pressure, Passenger Discharge Pressure, and Auxiliary Pressure must be calibrated. As shown on the example screen 286, this may be done by pressing the "Calibrate" button next to each PSI setting. The calibration process may involve the steps of manually moving the mixing head to the closed position and pressing the Calibrate button below the Inlet Cement Valve, manually moving the inlet water valve to the closed position and pressing "Set Zero," and manually moving the inlet water valve to the full open position and pressing "Set Max." This process should be performed prior to starting the job. Further, valve controls may be set to operate off the Densitometer mounted near the tub or auxiliary densitometer. To do this, a user may select densitometer with the "Inlet Cement Valve Control" button shown. If desired, the cement valve or water valve may be selected with the "Master Valve Selection." Once calibration is complete, a user may begin the job.

Figure 19:
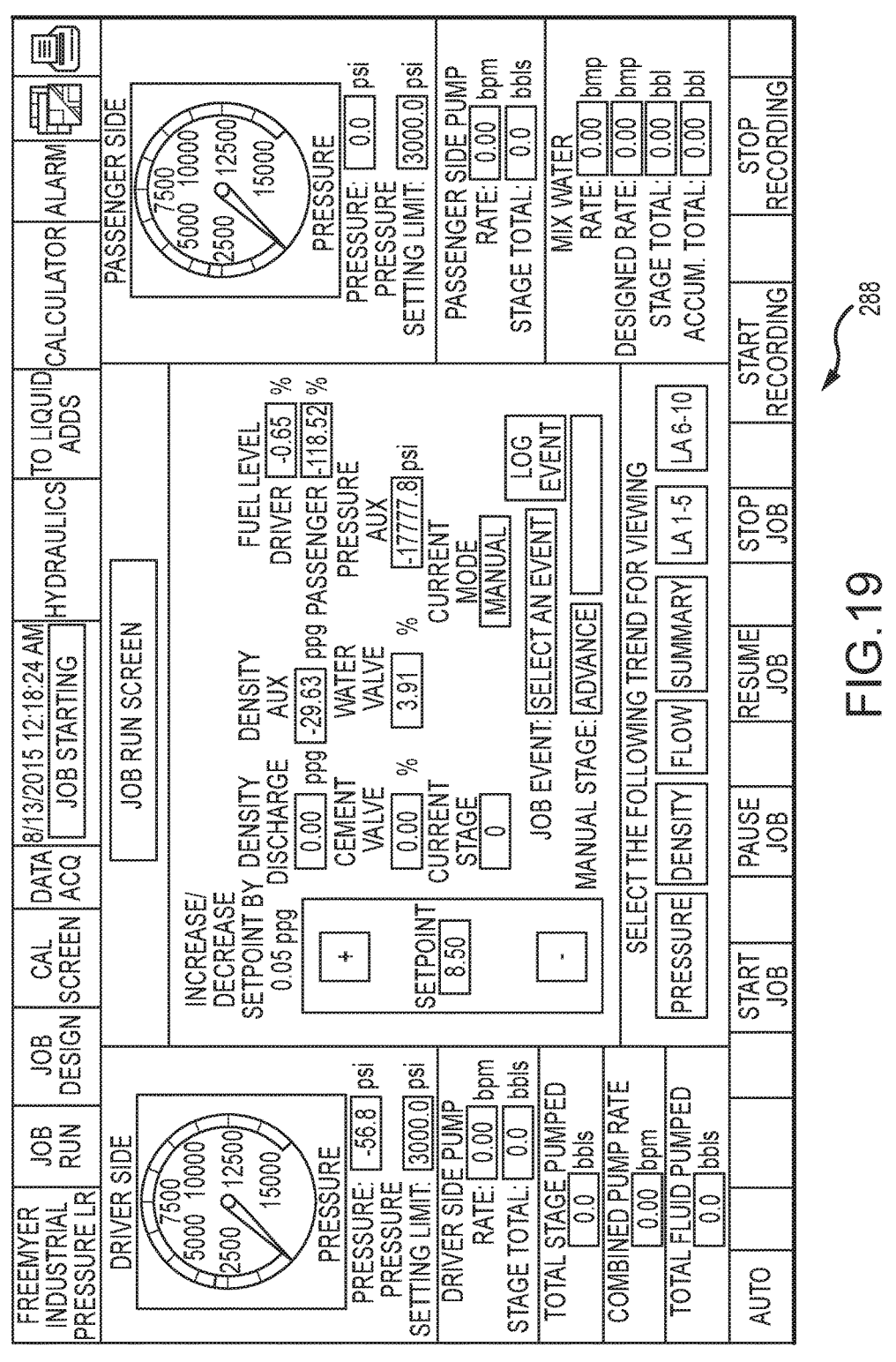

FIG. 19 shows an example Job Run Screen 288. A user will set the Pressure Setting Limit for the Driver Side and Passenger Side pumps by pressing on the field and entering job requirement maximum pressure setting. This step should be completed prior to any well operations to ensure your pressure limits are set.

The job run screen 288 further allows a user to record parameters and data for a specific job. To do this, a user may press the "Start Recording" button, shown in the bottom row of buttons. All parameters will immediately begin to record to the CSV file and will be stored in the Data Acquisition job number file. A user will then verify the selected Liquid Additive Pumps are in the Auto position prior to starting the job. Following these steps, a user may press the Start Job to begin the earlier designed stages of the job.

Figure 20:
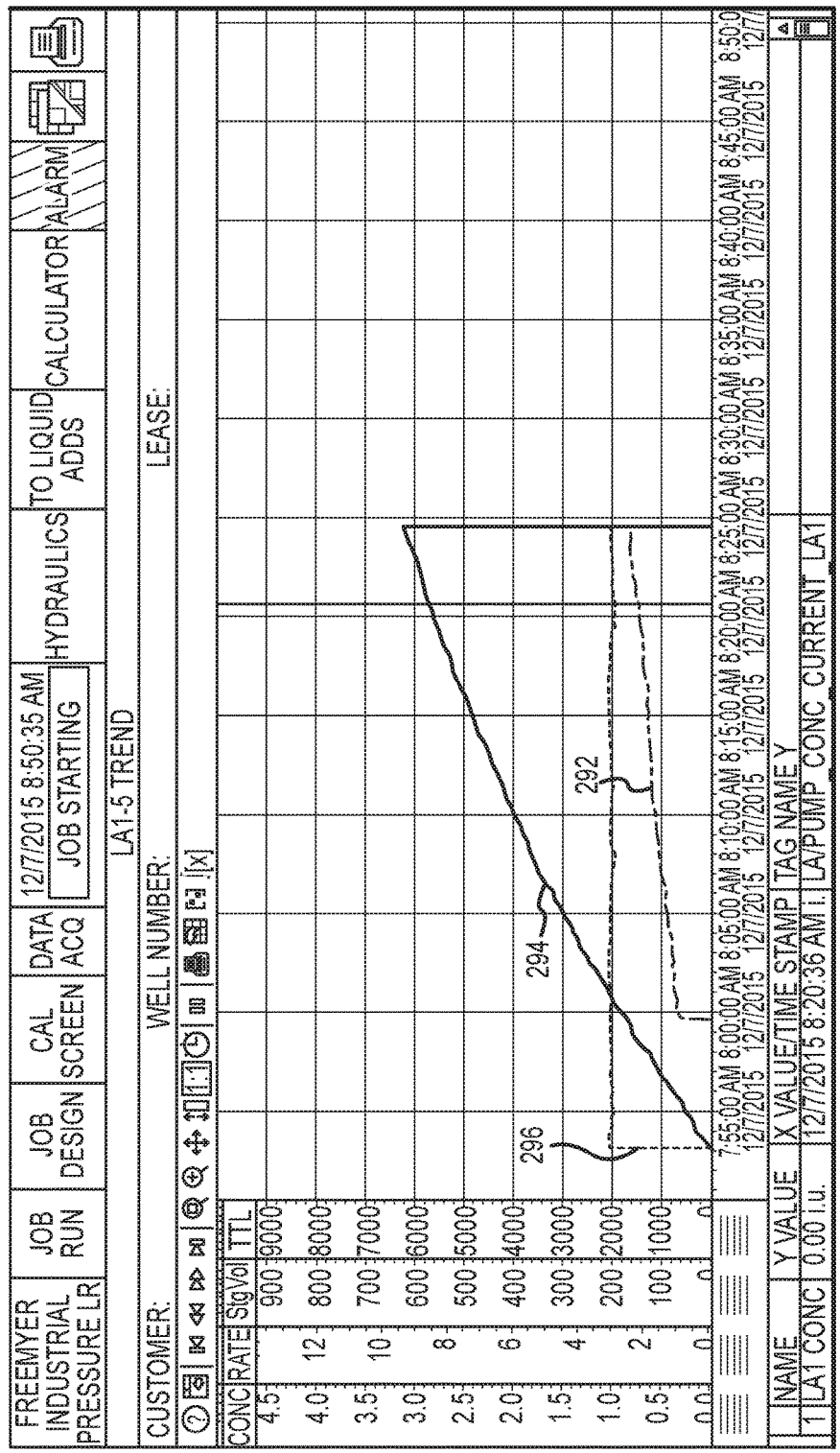
FIG. 20 shows an example output interface screen showing relevant concentrations using an increasing ramped injection rate.
Figure 21:
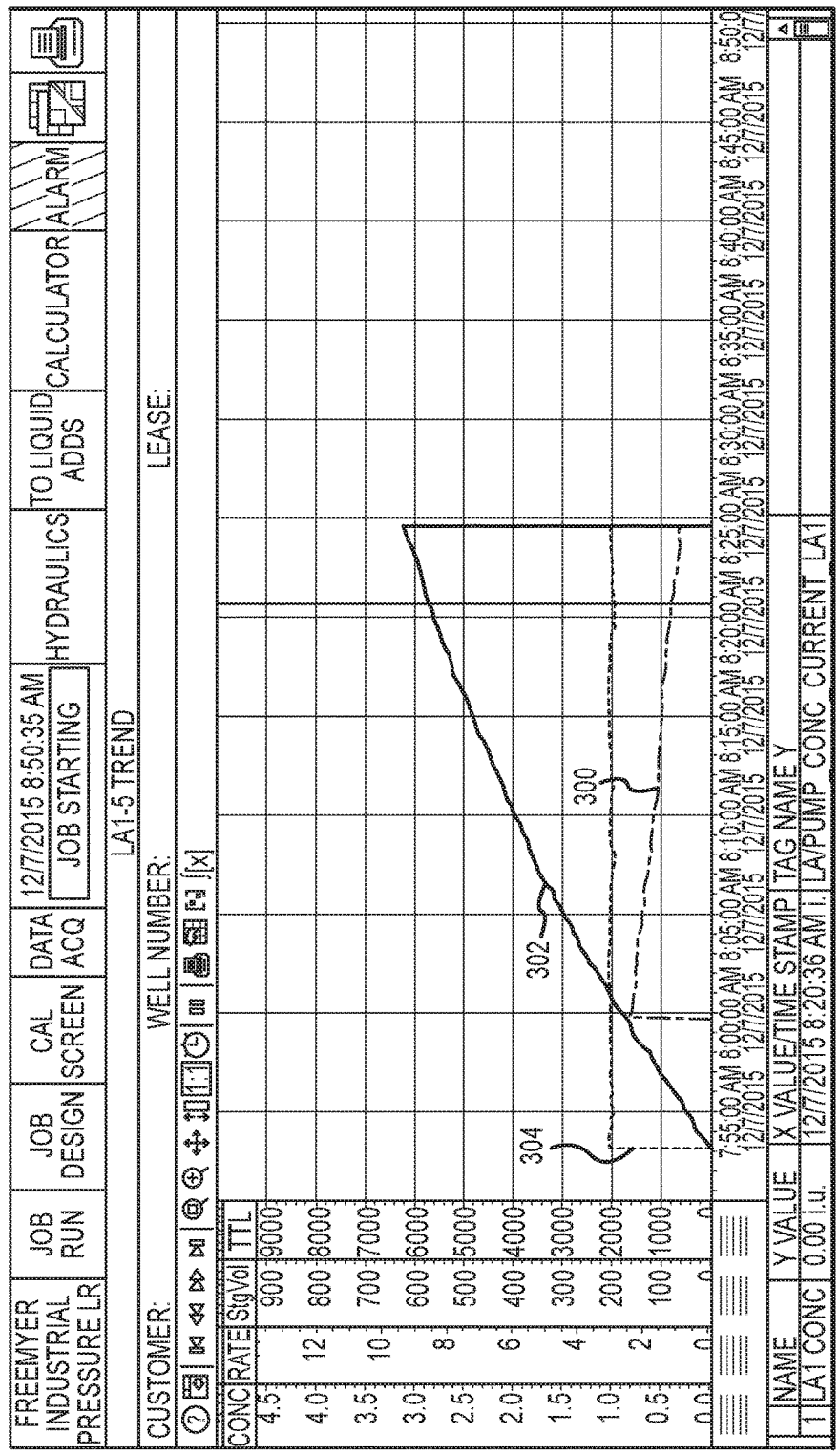
FIG. 21 shows an example output interface screen showing relevant concentrations using a decreasing ramped injection rate.
Figure 22:
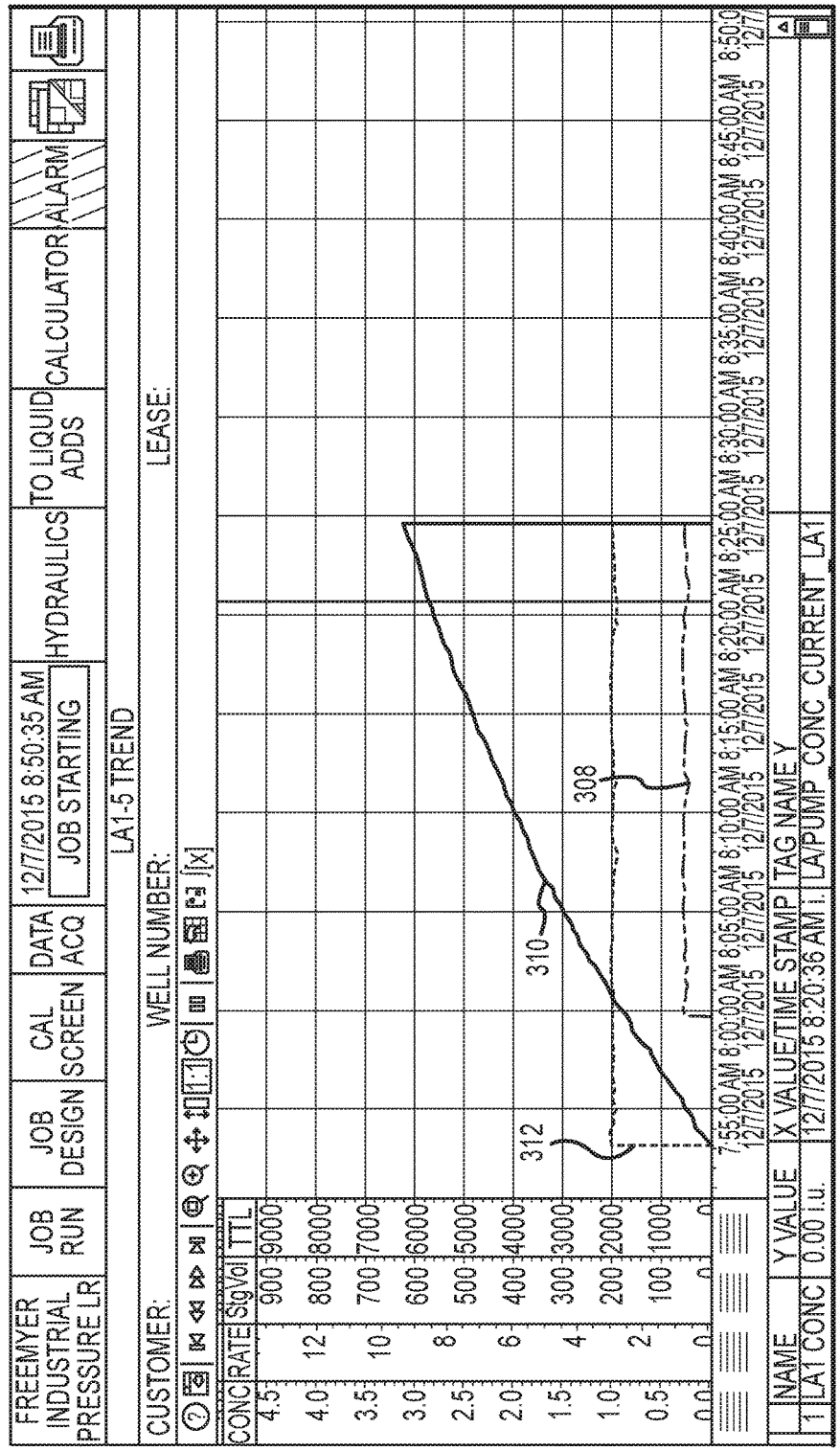
FIG. 22 shows an example output interface screen showing relevant concentrations using a constant injection rate.

FIGS. 20-22 show example output interface screens 290, 298, and 306 displaying relevant concentrations as they change over time while utilizing an increasing ramped injection rate 292, a decreasing ramped injection rate 300, and a constant ramped injection rate 308. As shown in FIG. 20, an output interface screen 290 displays the concentrations of various components. For example, this particular output interface screen 290 displays a job in which an increasing ramped injection rate 292 is being utilized. Additionally, the screen 290 also shows the total/stage volume 294 being pumped during the job, as well as the downhole pumping rate 296, which remains constant throughout the job. Similarly, FIG. 21 shows an output interface screen 298 for a pumping operation utilizing a decreasing ramped injection rate 300. As with FIG. 20, the screen 298 also shows the total/stage volume 302 and the downhole pumping rate 304, which remains constant. Lastly, FIG. 22 shows an output interface screen 306 for a pumping operation utilizing a constant injection rate 308. As with FIGS. 20 and 21, the screen 306 also displays the total/stage volume 310 as well as the downhole pumping rate 312, which remains constant.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

What is claimed is:

1. A method of cementing a well, the method comprising:
preparing a slurry from water and a dry blended material;
determining a fluid properties profile for said slurry, said fluid properties profile defining a first loading of a liquid chemical additive for a first zone of said well, a second loading of said liquid chemical additive for a second zone of said well, and variable loading of said liquid chemical additive between said first and second loadings; wherein said first and second zone loadings are based on at least one of well temperature, casing characteristics, openhole size, fluid rheology, and ground geological formation;
adding said liquid chemical additive to said slurry or said water; and
automatically controlling pumping of said slurry down the well,
wherein said chemical additive is added by a ramped injection during pumping to transition said slurry from said first zone loading to said second zone loading according to said fluid properties profile.

2. The method of claim 1, wherein:
said automatically controlling pumping is achieved by use of at least one computer processor/controller for controlling at least one liquid additive pump, and associated computer coded instructions for controlling operation of the pumps automatically, the computer coded instructions including a computer readable medium with instructions for executing preparation of a slurry comprising a plurality of constituent components.

3. The method of claim 1, wherein said slurry is selected from the group consisting of a cement slurry, spacer, flusher, and displacement fluid.

4. The method of claim 1, wherein said chemical additive is selected from the group consisting of accelerators, retarders, fluid loss additives, viscosifiers, dispersants, lightweight additives, surfactants, clay control additives, bacteria control additives, defoamers, and gas migration additives.

5. The method of claim 1, wherein said fluid properties profile defines said loadings for a second chemical additive and said second chemical additive is added by ramped injection.

6. The method of claim 1, wherein said variable loading of said chemical additive varies linearly from said first zone loading to said second zone loading.

7. The method of claim 1, wherein said variable loading of said chemical additive varies non-linearly from said first zone loading to said second zone loading.

8. The method of claim 1, wherein said slurry is a cement slurry and said chemical additive is an accelerator.

9. The method of claim 1, wherein said slurry is a cement slurry and said chemical additive is a retarder.

10. The method of claim 1, wherein said slurry is a cement slurry and said chemical additive is a viscosifier.

11. The method of claim 1, wherein said slurry is a cement slurry.

12. The method of claim 1, wherein said slurry is a spacer.

13. The method of claim 1, wherein said slurry is a flusher.

14. The method of claim 1, wherein said slurry is a displacement fluid.

15. A system for cementing a well, the system comprising:
- at least one slurry receptacle;
- at least one liquid chemical additive pump;
- a supply line for adding liquid chemical additives to a slurry made from water and a dry material within said receptacle or to said water;
- at least one computer processor/controller for controlling said liquid additive pumps, and associated computer coded instructions for controlling operation of the system automatically, the computer coded instructions including a computer readable medium with instructions for executing preparation of said slurry; and
- wherein the computer readable medium has instructions for automatically:
  a) reading a fluid properties profile for said slurry, wherein said fluid properties profile defines a first loading of a chemical additive for a first zone of said well, a second loading of said chemical additive for a second zone of said well, and variable loading of said chemical additive between said first and second loadings;
  b) adding said chemical additive to said slurry or said water; and
  c) pumping said slurry down the well, wherein said chemical additive is added by ramped injection during pumping to transition said slurry from said first zone loading to said second zone loading according to said fluid properties profile.

16. The system of claim 15, wherein said slurry is selected from the group consisting of a cement slurry, spacer, flusher, and displacement fluid.

17. The system of claim 15, wherein said chemical additive is selected from the group consisting of accelerators, retarders, fluid loss additives, viscosifiers, dispersants, lightweight additives, surfactants, clay control additives, bacteria control additives, defoamers, and gas migration additives.

18. The system of claim 15, wherein said fluid properties profile defines said loadings for a second chemical additive and said second chemical additive is added by ramped injection.

19. The system of claim 15, wherein said variable loading of said chemical additive varies linearly from said first zone loading to said second zone loading.

20. The system of claim 15, wherein said variable loading of said chemical additive varies non-linearly from said first zone loading to said second zone loading.

21. The system of claim 15, wherein said slurry is a cement slurry.

22. The system of claim 15, wherein said slurry is a spacer.

23. The system of claim 15, wherein said slurry is a flusher.

24. The system of claim 15, wherein said slurry is a displacement fluid.

25. A method of cementing a well, the method comprising:
- preparing a cementitious slurry;
- determining a fluid properties profile for said slurry, said fluid properties profile defining a first loading of a liquid chemical additive for a first zone of said well, a second loading of said liquid chemical additive for a second zone of said well, and variable loading of said liquid chemical additive between said first and second loadings;
- matching a composition of said slurry with said fluid properties profile by adding said liquid chemical additive; and
- pumping said slurry down the well, wherein said liquid chemical additive is added by ramped injection to transition said slurry from said first zone loading to said second zone loading according to said fluid properties profile.

26. The method of claim 25, wherein said chemical additive is selected from the group consisting of accelerators, retarders, fluid loss additives, viscosifiers, dispersants, lightweight additives, surfactants, clay control additives, bacteria control additives, defoamers, and gas migration additives.

27. The method of claim 25, further comprising:
- providing at least one computer processor/controller for controlling liquid additive pumps and pumps that pump said slurry down the well, and associated computer coded instructions for controlling pumping automatically, the computer coded instructions including a computer readable medium with instructions for executing preparation of said slurry.

28. The method of claim 25, wherein said fluid properties profile defines said loadings for a second chemical additive and said second chemical additive is added by ramped injection.

29. The method of claim 25, wherein said variable loading of said chemical additive varies linearly from said first zone loading to said second zone loading.

30. The method of claim 25, wherein said variable loading of said chemical additive varies non-linearly from said first zone loading to said second zone loading.

31. The method of claim 25, wherein said chemical additive is an accelerator.

32. The method of claim 25, wherein said chemical additive is a retarder.

33. The method of claim 25, wherein said chemical additive is a viscosifier.

* * * * *